(12) United States Patent
Wilke et al.

(10) Patent No.: US 11,669,631 B2
(45) Date of Patent: Jun. 6, 2023

(54) DATACULE STRUCTURE AND METHOD FOR STORING DATA IN A TAMPER-PROOF MANNER

(71) Applicant: Bundesdruckerei GMBH, Berlin (DE)

(72) Inventors: Andreas Wilke, Berlin (DE); Manfred Paeschke, Wandlitz (DE); Ilya Komarov, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 471 days.

(21) Appl. No.: 16/650,135

(22) PCT Filed: Sep. 20, 2018

(86) PCT No.: PCT/EP2018/075503
§ 371 (c)(1),
(2) Date: Mar. 24, 2020

(87) PCT Pub. No.: WO2019/057832
PCT Pub. Date: Mar. 28, 2019

(65) Prior Publication Data
US 2020/0279052 A1 Sep. 3, 2020

(30) Foreign Application Priority Data
Sep. 25, 2017 (DE) ...................... 10 2017 216 974.5

(51) Int. Cl.
*G06F 21/62* (2013.01)
*G06F 16/23* (2019.01)
(Continued)

(52) U.S. Cl.
CPC ...... *G06F 21/6227* (2013.01); *G06F 16/2365* (2019.01); *G06F 21/64* (2013.01);
(Continued)

(58) Field of Classification Search
CPC .. G06F 16/2365; G06F 21/6227; G06F 21/64; G06F 2221/2113; H04L 2209/38; H04L 9/3239; H04L 9/3247
See application file for complete search history.

(56) References Cited

U.S. PATENT DOCUMENTS 6,101,604 A * 8/2000 Barton ............... H04N 1/32154
380/54
6,359,985 B1 * 3/2002 Koch ................... H04N 7/1675
380/54

(Continued)

FOREIGN PATENT DOCUMENTS

DE 102016224533 A1 6/2018
WO WO-2018104277 A1 6/2018

OTHER PUBLICATIONS

Search Query Report from IP.com (performed Jun. 24, 2022) (Year: 2022).*

(Continued)

*Primary Examiner* — Sharon S Lynch
(74) *Attorney, Agent, or Firm* — Harness, Dickey & Pierce, P.L.C.

(57) ABSTRACT

A method for storing data in a tamper-proof manner in a data block structure. The method includes, for a group of data blocks, determining functions, which are assigned to the data blocks of the group and dependent on the data stored in the corresponding data block; creating a combination of all functions assigned to the data blocks of the group; and determining a combination-dependent coefficient for each function of the combination, so that the combination meets a predefined condition; and for each data block of the group, determining a control group of data blocks of the group assigned to the corresponding data block; and storing the coefficient that was determined for the function of the (Continued)

corresponding data block in all data blocks of the control group.

34 Claims, 13 Drawing Sheets

(51) Int. Cl.
*G06F 21/64* (2013.01)
*H04L 9/32* (2006.01)
*H04L 9/00* (2022.01)

(52) U.S. Cl.
CPC .......... *H04L 9/3239* (2013.01); *H04L 9/3247* (2013.01); *G06F 2221/2113* (2013.01); *H04L 9/50* (2022.05)

(56) References Cited

U.S. PATENT DOCUMENTS

| | | | | |
|---|---|---|---|---|
| 8,798,263 | B2* | 8/2014 | Pasini | H04L 9/06 380/42 |
| 9,635,000 | B1* | 4/2017 | Muftic | H04L 9/3239 |
| 10,805,090 | B1* | 10/2020 | Poelstra | H04L 9/50 |
| 11,431,561 | B2* | 8/2022 | Smith | H04L 69/22 |
| 2012/0250856 | A1* | 10/2012 | Pasini | H04L 9/06 380/37 |
| 2015/0244690 | A1* | 8/2015 | Mossbarger | H04L 9/3263 713/171 |
| 2019/0147532 | A1* | 5/2019 | Singh | H04L 9/3239 705/35 |
| 2019/0349426 | A1* | 11/2019 | Smith | H04L 9/0825 |
| 2020/0057869 | A1* | 2/2020 | Wilke | G06F 21/64 |
| 2020/0089915 | A1* | 3/2020 | Falk | H04L 9/3247 |
| 2020/0177563 | A1* | 6/2020 | Huapaya | H04L 9/3234 |
| 2020/0235913 | A1* | 7/2020 | Wilke | H04L 9/0643 |
| 2020/0259634 | A1* | 8/2020 | Wilke | H04L 9/0643 |
| 2020/0287707 | A1* | 9/2020 | Wilke | H04L 9/0643 |
| 2020/0344043 | A1* | 10/2020 | Komarov | H04L 9/3073 |

OTHER PUBLICATIONS

Search Query Report from IP.com (performed Dec. 20, 2022) (Year: 2022).*
International Search Report dated Jan. 7, 2019, issued in corresponding PCT Application WO 2019/057832-A1.
Written Opinion dated Jan. 7, 2019, issued in corresponding PCT Application WO 2019/057832-A1.
S. Nakamoto, 'Bitcoin: A Peer-to-Peer Electronic Cash System' Oct. 2008, pp. 1-9, retrieved from the internet Jul. 4, 2017 http://nakamotoinstitute.org/static/docs/bitcoin.pdf.
D. Schwartz, 'The Ripple Protocol Consensus Algorithm' Ripple Labs Inc, Jan. 2014, retrieved on the internet Apr. 19, 2018 https://ripple.com/files/ripple_consensus_whitepaper.pdf.
Dr. Andreas Wilke, 'Blockchain—Verbesserungspotential der Technologie' Bundesdruckerei GmbH, *Berlin Innovations*, 2017.
Blockchain, *Wikipedia*, 2020, retrieved on the internet Mar. 27, 2020 https://en.wikipedia.org/wiki/Blockchain.
A. M. Antonopoulos, Mastering Bitcoin—Chapter 7—The Blockchain O'Reilly Media, Inc., Dec. 2014.
Preliminary Report on Patentability dated Apr. 9, 2020, issued in corresponding International Application No. PCT/EP2018/075503.

* cited by examiner

DATACULE STRUCTURE AND METHOD FOR STORING DATA IN A TAMPER-PROOF MANNER

CROSS-REFERENCE TO RELATED APPLICATIONS

This application is a national phase under 35 U.S.C. § 371 of PCT International Application No. PCT/EP2018/075503 which has an International filing date of Sep. 20, 2018, which claims priority to German Application No. 10 2017 216 974.5, filed Sep. 25, 2017, the entire contents of each of which are hereby incorporated by reference.

DESCRIPTION

The invention relates to a method and to an electronic data storage system for storing data. In particular, the invention relates to a method and to an electronic data storage system for storing data in a tamper-proof manner in a data block structure.

Securely storing digitally encoded data, the digitally encoded data being effectively protected against possible alterations or even deliberate manipulation, presents a technical challenge.

Blockchains are known from the prior art, for example, for securing data. For example, such blockchains are used to log transactions of cryptocurrencies, such as in the Bitcoin payment system.

A blockchain provides an expandable list of data sets, which are arranged in blocks or data blocks. In the prior art, the integrity of the individual data blocks is secured by unidirectional linking, using cryptographic check values of the individual data blocks in the form of hash values. A linking of the blocks is achieved in that each data block includes a cryptographic check value of the preceding data block, including the cryptographic check value stored in the preceding data block. Each data block includes a check value, which is based on the content of all the preceding data blocks. As a result, it is difficult to subsequently manipulate such a blockchain since this would require manipulating not just a single data block, but all subsequent blocks, since the check value of each following data block is based, among other things, on the check value of the data block to be manipulated. If a data block is in fact manipulated, the check value thereof changes. This changed check value no longer matches the check values of the following data blocks, making the manipulation recognizable and obvious during a check by way of the check values.

For examples of a blockchain, see https://en.wikipedia.org/wiki/Block_chain_(database) and "Mastering Bitcoin," Chapter 7, The Blockchain, page 161 ff. The blockchain concept was described in 2008, for example, in a whitepaper under the pseudonym Satoshi Nakamoto in the context of the Bitcoin cryptocurrency ("Bitcoin: Peer-to-Peer Electronic Cash System" (https://bitcoin.org/bitcoin.pdf)). In this exemplary embodiment, each block of the blockchain, in the header thereof, includes the hash of the entire prior block header. In this way, the sequence of blocks is clearly established, creating a chain structure. As a result of the concatenation of the individual blocks thus implemented, it is achieved that a subsequent alteration of prior blocks is not possible, without likewise altering all subsequent blocks.

It is the object of the invention to create an improved method for storing data in a tamper-proof manner.

The object underlying the invention is achieved by the features of the independent claims. Embodiments of the invention are described in the dependent claims.

In the case of known blockchains, data blocks are concatenated or linked to one another in the form of a linear chain structure. Linking takes place in each case unidirectionally between data blocks immediately following one another in the sequence. The link is unidirectional since a hash value of the data of the immediately preceding data block in the sequence is stored in each case in the following data block. When the data of the corresponding preceding data block is altered, the hash value stored in the following data block no longer matches the data of the corresponding preceding data block. In this way, it is possible to check the data integrity of the preceding data block based on the hash value of the following data block, but not vice versa. In other words, the following data block may be arbitrarily changed, without this influencing the link to the immediately preceding data block, as long as the stored hash value remains unchanged.

In the case of known blockchains, the hash value of a first preceding data block is stored in each case in the immediately following data block in the sequence. The hash value of the immediately following data block and of all further data blocks following in the sequence is dependent on the hash value of the first preceding data block. So as to successfully manipulate the data of the first preceding data block, consequently also the hash values of all subsequent data blocks would likewise have to be manipulated. In this way, the security of a data block increases with the number of data blocks that follow since the necessary manipulation complexity increases with the number of data blocks that follow. However, as a result, the security level of the data blocks is position-dependent and may thus vary within wide ranges. For example, the last block of a blockchain may be manipulated without this block being protected by other data blocks.

Finally, known blockchains do not provide any option for altering data. In particular, no option is provided for deleting data blocks. Once a data block has been added to a blockchain, all users rely on this data block not being altered again. For this purpose, new data blocks for blockchains, for example in the case of the cryptocurrency Bitcoin, are generated in a computationally intensive process, known as mining.

Essentially the entire processing power of the Bitcoin network during mining is needed for solving a cryptographic problem, the proof-of-work. This is intended to ensure that the generation of valid blocks is associated with a certain level of complexity, so that a subsequent modification of the blockchain, for example in the case of the scenario of a 51% attack, may essentially be precluded. In the case of Bitcoin, the proof-of-work involves finding a hash value that is below a particular threshold value. The threshold value is conversely proportional to the mining difficulty. The complexity for solving the proof-of-work may be controlled by way of the threshold value, since the likelihood of finding a suitable hash decreases as the threshold value decreases.

According to known blockchains, due to the one-dimensional, linear chain structure, individual data blocks of the blockchain either have no (last data block of the blockchain), one (first data block of the blockchain) or two neighboring data blocks (middle data block of the blockchain). However, it is structurally precluded for one of the data blocks to have more than two neighboring data blocks.

In contrast, the present invention provides a method for storing data in a tamper-proof manner, which makes it possible to create and check data block structures having multi-dimensional links or concatenations. Such a multi-dimensional data block structure is also referred to hereafter as a datacule or datacule structure, based on molecules or molecule structures. Atoms from the periodic table of the elements may be used as an analogy, having valences that correspond to the number of the valence electrons. So as to implement a multiply concatenated data block structure, data blocks having difference valences are defined. In the present case, this means data blocks comprising control groups of differing sizes, that is, the number of data blocks. Such a data block structure allows greater flexibility during the concatenation of data blocks: By defining data blocks having different valences, it is possible to implement highly interlinked datacules. These may advantageously be used for the secure-identity data distribution in distributed IT systems.

Here and hereafter, a datacule structure shall be understood to mean a data block structure that comprises at least one group of data blocks, wherein all data blocks of the corresponding group are mutually linked to one another by a shared combined function, which encompasses a combination of individual functions of all data blocks of the corresponding group. The individual functions are each assigned to one of the data blocks and dependent on the data stored in the corresponding data block. To provide security against manipulations, unique combination-dependent coefficients are stored in the datacule structure for each of the individual functions of the shared combined function, wherein the shared combined function with the unique combination-dependent coefficients meets a predefined condition, and in particular an extreme value condition.

The method proposed here makes it possible to link a data block to more than two neighboring data blocks. Moreover, the multi-dimensional concatenation options may enhance the potential security of the data blocks connected to one another.

Embodiments relate to a method for storing data in a tamper-proof manner in an electronic memory, using a data block structure comprising a plurality of data blocks, wherein each of the data blocks is assigned a function that is dependent on the data stored in the corresponding data block,
the method for mutually concatenating all data blocks of a first group of data blocks so that each data block of the first group is dependent on all other data blocks of the first group comprising:
   for the first group of data blocks:
      determining the functions assigned to the data blocks of the first group;
      creating a first combination of all functions assigned to the data blocks of the first group; and
      determining a combination-dependent coefficient for each function of the first combination so that the first combination meets a first predefined condition;
   for each data block of the first group:
      determining a control group of data blocks of the first group which is assigned to the corresponding data block; and
      storing the coefficient that was determined for the function of the corresponding data block in all data blocks of the control group.

A data block structure shall be understood to mean a data structure comprising a plurality of data blocks. In particular, a data block structure shall be understood to mean a database, the integrity of which, that is, security against manipulation, is cryptographically secured by the storage of coefficients of a combination of data-dependent functions assigned to the individual data blocks. The functions are each assigned to the data stored in one of the data blocks and uniquely characterize this data. For example, each of the functions includes a check value of the data, such as a hash value, serving as a parameter. For example, the hash value may be a hash value calculated by way of a MD5, Sha-1 or Sha-2 hashing algorithm.

The data block structure may comprise one or more groups of data blocks. The data blocks of a first group of the one or more groups of data blocks may be mutually concatenated, using the above-described method, in such a way that the data included in the data blocks is stored in a tamper-proof manner. An concatenation of data blocks is a cryptographic concatenation. In the case of this cryptographic concatenation, a cryptographic operation is applied to the respective data content of the data blocks to be concatenated. In the case of a mutual concatenation, the corresponding cryptographic operation is applied to all data blocks to be concatenated.

Data may be stored in a data block, as may be one or more coefficients, which cryptographically secure the integrity of the stored data and/or the integrity of data of further data blocks.

A check value for data is a value that is assigned to the corresponding data and unambiguously characterizes the data in such a way that the integrity of the data may be checked based on the stored check value. A check value in the form of a checksum, for example, provides a value that was calculated from the original data and is configured to recognize at least one bit error in the data. As a function of the complexity of the calculation rule for the checksum, it is possible to recognize, or also correct, more than one error. Known check values or checksums may be based, for example, on adding up data values, calculating a digit sum, a parity bit, a weighted average of the data, or on more complex calculation methods, such as a cyclic redundancy check or the use of a hash function.

The functions that are assigned to the data blocks include polynomials and/or exponential functions, for example. For example, the functions are provided in the form of a family of functions, from which a data block-dependent function is generated by using a data block-dependent or data-dependent check value as a function parameter.

A family of functions denotes a plurality of functions, which differ in at least one parameter. The functions may be one-dimensional or multi-dimensional functions, that is, the functions may encompass one or more variables. For example, the functions differ in one parameter. For example, the functions differ in n parameters, wherein the n parameters form an n-tuple. Functions of the family of functions are unambiguously identifiable based on the parameters in which they differ. For example, the functions of the family of functions are elements of a function space and may be described by a functional, that is, a function on functions.

A parameter denotes a function-individual constant, that is, a value that may vary from function to function of the family of functions, but is always established or constant for a particular function. A parameter may be, for example, a summand, minuend, subtrahend, factor, dividend, divisor or an exponent.

It is known from the prior art how to generate a number, that is, a check value, from arbitrary data or pieces of information using specific functions, such as hash functions. Embodiments may have the advantage that not only numbers, but also analytical functions are generated from the data of the data blocks. The numbers are used, for example, as the intermediate result for this purpose, but at the end there is a combination of data block-dependent functions for cryptographically protecting the stored data of the data block structure. For example, the functions serve as linking functions, or the coefficients calculated for these serve as identifiers for linking functions of data blocks, which may be used to check and verify the integrity of the corresponding data blocks.

The combination of the functions may encompass a linear combination of the corresponding functions. A corresponding linear combination represents a connection of all data blocks of the first group of data blocks. This connection, serving as a status function, may describe a status of the first group. This connection may be combined with a connection function, wherein the status of the group is dependent on the connection function. A predefined condition may be specified with regard to the status of the first group. This condition is an extreme value condition, for example, that is, the first derivative of the first combination of all functions which describes the status of the first group of data blocks is to be equal to zero. The system of equations resulting therefrom may be solved for the coefficients of the individual functions of the data blocks of the first group, and the corresponding coefficients may be determined. The corresponding coefficients are, for example, the coefficients of a linear combination of the functions that form the connection of the data blocks of the first group. Each data block of the first group is assigned a control group. The coefficients of each data block thus determined are stored in the data blocks of the control group of the corresponding data block. The integrity of the data of the data blocks may be checked based on the stored coefficients. For this purpose, it may be checked, for example, whether a combination of functions created for the data blocks of the first group with the stored coefficients of the control group in fact meets the first predefined condition. If the data in the data blocks of the first group is unchanged, the combination meets the predefined condition with the stored coefficients.

Embodiments may have the advantage that the data of all data blocks, by way of the respective functions, are considered in the combination of the coefficients, which may serve as check coefficients for the integrity of the corresponding data. If the data content of even only one of the data blocks is altered, the function assigned to the corresponding data block changes, and consequently the combination of all functions. Changed coefficients result for a changed combination, the combination meeting the predefined condition for the changed coefficients. In contrast to known blockchains, the corresponding first group of data blocks does not include a single data block that could be altered without the coefficients of all functions that meet the first predefined condition also changing.

In contrast to known blockchains, the present method makes it possible to establish a respective control group of data carriers in a freely selectable number for each data block of the first group. The coefficient of the function of the data block to which the control group is assigned is stored in the data blocks of the respective control group. In contrast to known blockchains, the coefficients are stored after the corresponding coefficients that implement the cryptographic concatenations for the group have been calculated. In known blockchains, in contrast, the cryptographic concatenation of the blocks takes place successively in sequence. In other words, a hash value is calculated for one block and is stored in the subsequent block. Thereafter, a hash value is calculated for the subsequent block and is stored in the block following this block, and so forth. By establishing the number of data blocks in the control group of a particular data block, the number of links of the corresponding data block is established. It must be noted in the process that the calculated coefficients are dependent on the data content of all data blocks. Linking here shall be understood to mean storing, in a second data block, a cryptographic check value for checking the data identity of a first data block. A concatenation of two data blocks here shall be understood to mean that a combination of data block-dependent functions encompasses both a function that is dependent on the data stored in the first of the two data blocks, and a function that is dependent on the data stored in the second of the two data blocks, and combination-dependent coefficients for the functions of the corresponding combination are stored in the data block structure. Altering the data stored in the first of the two data blocks thus causes at least one combination-dependent coefficient of the function that is dependent on the data stored in the second of the two data blocks to change.

By storing the check value, a unidirectional link is implemented between the first data block and the second data block. A bidirectional link is implemented by an additional second check value for checking the data integrity of the second data block in the first data block. By establishing the number of data blocks, which each comprise the control groups, the present method makes it possible to establish the number of links. The higher the number of links of a data block, the higher is the security thereof, since in the event of a manipulation attempt an accordingly high number of data blocks of the control group would have to be manipulated, which include the coefficient as the check value. According to exemplary embodiments, the number of the data blocks in the control groups may be adapted to the security level of the data blocks which are each assigned to the control groups. When a data block includes data assigned to a low security level, a small number of data blocks in the control group is sufficient, for example, one or two data blocks. In the case of highly sensitive data, for which an accordingly high security level is established, the number of data blocks in the corresponding control group may be selected to be considerably higher, for example 10, 20, 50, 100, 1000.

The present method furthermore allows data in data blocks to be altered, that is, to be added, to be replaced and/or to be deleted. According to embodiments, it is possible to delete even entire data blocks. In the event of an alteration of data in one or more of the data blocks, the functions of the corresponding data blocks are re-determined or changed, taking the changes into consideration, and updated coefficients are determined for all data blocks, taking the changed functions into consideration which are connected to one another by a combination of functions encompassing the changed functions. The stored coefficients are replaced with the updated coefficients or, if data blocks are deleted, the coefficients of the functions of the deleted data blocks are likewise deleted. The security of this procedure may be ensured in that only certain institutions, such as the owners of the data blocks, have a write authorization for the data blocks, or that the respective owners of the corresponding data blocks have to consent to a storage, replacement and/or deletion of coefficients in the data blocks. In the latter case, alterations of the data block structure, be it by an addition of new data blocks, a deletion of existing data blocks and/or an alteration of existing data blocks, may only be made when a corresponding consent is available.

A first check value $n_1$, for example a hash value, is calculated from the data $D_1$ of a first block of the data block structure. This check value is inserted in a function of a family of functions $\xi_k(x)$ where $k \in \mathbb{N}$ as a parameter, whereby a data block-dependent function $\xi_1(x)$ is determined, which is dependent on the data $D_1$ stored in the corresponding data block, and thus is data block individual.

$$D_1 \to n_1 \to \xi_1(x)$$

Data block-dependent functions $\xi_2(x), \ldots, \xi_N(x)$ for all further data blocks of a group of N data blocks are determined analogously:

$$D_2 \to n_2 \to \xi_2(x)$$

$$D_N \to n_N \to \xi_N(x)$$

A combination $\psi$ is created from the data block-dependent functions $\xi_1(x), \ldots, \xi_N(x)$, such as a linear combination.

$$\Psi = \sum_{i=1}^{N} \psi_i = \sum_{i=1}^{N} c_i \xi_i$$

Each of the data block-dependent functions $\xi_i(x)$ is assigned a combination-dependent coefficient $c_i$.

A linear combination $\psi$ of two data block-dependent functions $\xi_1(x), \xi_2(x)$ of two data blocks including the data $D_1$ and $D_2$ will be considered hereafter by way of example:

$$\Psi = \sum_{i=1}^{2} \psi_i = \sum_{i=1}^{2} c_i \xi_i = c_1 \xi_1 + c_2 \xi_2$$

The linear combination $\psi$ represents a status function, which describes the status of the two data blocks. Analogously to a Hamiltonian operator of a molecule, it is possible to determine the combination E may be determined for a datacule from the linear combination $\psi$, using the connection function $\hat{H}$, which is applied to the linear combination $\psi$:

$$E = \frac{\langle \Psi | \hat{H} | \Psi \rangle}{\langle \Psi | \Psi \rangle}$$

$$= \frac{\langle \sum_{i=1}^{2} c_i \xi_i | \hat{H} | \sum_{i=1}^{2} c_i \xi_i \rangle}{\langle \sum_{i=1}^{2} c_i \xi_i | \sum_{i=1}^{2} c_i \xi_i \rangle}$$

$$= \frac{\sum_{i=1}^{N} \sum_{j=1}^{N} c_i c_j H_{ij}}{\sum_{i=1}^{N} \sum_{j=1}^{N} c_i c_j S_{ij}}$$

The connection function $\hat{H}$ may, for example, be a constant (for example, $V_0$), a derivative function with respect to one of the variables of the data block-dependent functions (for example, $$\frac{\partial}{\partial x}\Big),$$

a linear function in one of the variables of the data block-dependent functions (for example, x), a non-linear function, such as a polynomial function of the order $n>1$ (for example, $\tfrac{1}{2}kx^2$), or a combination of the aforementioned variants (for example, $$x \frac{\partial}{\partial x}\Big).$$

$$\hat{H} = V_0,$$
$$\hat{H} = x,$$
$$\hat{H} = \frac{\partial}{\partial x},$$
$$\hat{H} = x \frac{\partial}{\partial x},$$
$$\hat{H} = \frac{1}{2} k x^2.$$

The aforementioned exemplary definition of the combination E furthermore includes the following abbreviations $H_{ij}$, $S_{ij}$:

$$H_{ij} = \langle \xi_i | \hat{H} | \xi_j \rangle = \int dV \xi_i^*(x) \hat{H} \xi_j(x)$$

$$S_{ij} = \langle \xi_i | \xi_j \rangle = \int dV \xi_i^*(x) \xi_j(x)$$

In the exemplary case of a linear combination $\psi$ of two data block-dependent functions, the following results for E as a function of the coefficients $c_1$, $c_2$ of the linear combination $\psi$:

$$E(c_1, c_2) = \frac{c_1^* c_1 H_{11} + c_1^* c_2 H_{12} + c_2^* c_1 H_{21} + c_2^* c_2 H_{22}}{c_1^* c_1 S_{11} + c_1^* c_2 S_{12} + c_2^* c_1 S_{21} + c_2^* c_2 S_{22}}$$

For example, an extreme value condition may be established as the predefined condition, from which the coefficients $c_1$, $c_2$ are derived:

$$\frac{\partial E(c_1, c_2)}{\partial c_1} = \frac{\partial E(c_1, c_2)}{\partial c_2} \stackrel{!}{=} 0$$

$$\frac{\partial E(c_1, c_2)}{\partial c_1^*} = \frac{\partial E(c_1, c_2)}{\partial c_2^*} \stackrel{!}{=} 0$$

This yields the following homogeneous system of equations:

$$\begin{pmatrix} H_{11} - ES_{11} & H_{12} - ES_{12} \\ H_{21} - ES_{21} & H_{22} - ES_{22} \end{pmatrix} \begin{pmatrix} c_1 \\ c_2 \end{pmatrix} \stackrel{!}{=} \begin{pmatrix} 0 \\ 0 \end{pmatrix}$$

A non-trivial solution, that is, $c_1 \neq 0$ and $c_2 \neq 0$, results when the determinant vanishes:

$$\begin{vmatrix} H_{11} - ES_{11} & H_{12} - ES_{12} \\ H_{21} - ES_{21} & H_{22} - ES_{22} \end{vmatrix} \stackrel{!}{=} 0,$$

in other words, if $$(H_{11} - ES_{11})(H_{22} - ES_{22}) - (H_{21} - ES_{21})(H_{12} - ES_{12}) \stackrel{!}{=} 0.$$

For the coefficients $c_1$, $c_2$ to be unambiguously determined, another condition, such as a normalization, $$\sum_{i=1}^{N} c_i^2 \stackrel{!}{=} 1,$$

that is $$c_1^2 c_2^2 = 1$$

must be predefined.

Hereafter, a group having N data blocks is considered, for example, which are each assigned a data-dependent, that is, data block-dependent, function $\xi_i$. The functions $\xi_i$ are, for example, two- or three-dimensional functions, which depend on the data of the particular data block by way of a data-dependent parameter. The functions $\xi_i$ form basis functions for the status function $\psi$ of the group. The combination of the functions $\xi_i$ the status function $\psi$, is a linear combination of basis functions, for example:

$$\Psi(x, y; c_i, \ldots, c_N) = \sum_{i=1}^{N} \psi_i(x, y),$$

$$\Psi(x, y, z; c_i, \ldots, c_N) = \sum_{i=1}^{N} \psi_i(x, y, z).$$

In the combination $\psi$, a respective coefficient $c_i$ is assigned to the basis functions $\xi_i$.

$$\psi_i(x,y) = c_i \xi_i(x,y),$$

$$\psi_i(x,y,z) = c_i \xi_i(x,y,z).$$

For example, the basis functions $\xi_i$ are Gaussian functions, that is, probability densities of normal or Gaussian distributions. In the two-dimensional case, the basis functions $\xi_i$ are, for example, given by:

$$\xi_i(x, y) = e^{-\frac{1}{2}n_i\left[\left(x-\frac{a_i}{2}\right)^2 + \left(y-\frac{b_i}{2}\right)^2\right]},$$

wherein $n_i$ is a parameter, for example, which depends on the data $D_i$ of the i-th data block, while the parameters $a_i$ and $b_i$ are, for example, independent of the data $D_i$.

In the three-dimensional case, the basis function $\xi_i$ looks as follows, for example:

$$\xi_i(x, y, z) = e^{-\frac{1}{2}n_i\left[\left(x-\frac{a_i}{2}\right)^2 + \left(y-\frac{b_i}{2}\right)^2 + \left(z-\frac{d_i}{2}\right)^2\right]}$$

with the data-dependent parameter $n_i$ and the data-independent parameters $a_i$, $b_i$ and $d_i$.

The connection function selected, for example, in 2D is:

$$\hat{H}(x,y) = x^2 + y^2$$

and in 3D is:

$$\hat{H}(x,y,z) = x^2 + y^2 + z^2.$$

For N data blocks, it follows $$E(c_1, \ldots, c_N) = \frac{\left\langle \sum_{i=1}^{N} c_i \xi_i |\hat{H}| \sum_{i=1}^{N} c_i \xi_i \right\rangle}{\left\langle \sum_{i=1}^{N} c_i \xi_i \Big| \sum_{i=1}^{N} c_i \xi_i \right\rangle} = \frac{\sum_{i=1}^{N}\sum_{j=1}^{N} c_i c_j H_{ij}}{\sum_{i=1}^{N}\sum_{j=1}^{N} c_i c_j S_{ij}},$$

wherein it has to apply that $$\begin{pmatrix} H_{11} - ES_{11} & \cdots & H_{1N} - ES_{1N} \\ \vdots & \ddots & \vdots \\ H_{N1} - ES_{N1} & \cdots & H_{NN} - ES_{NN} \end{pmatrix} \begin{pmatrix} c_1 \\ \vdots \\ c_N \end{pmatrix} \stackrel{!}{=} \begin{pmatrix} 0 \\ \vdots \\ 0 \end{pmatrix},$$

that is, for a non-trivial solution.

$$\begin{vmatrix} H_{11} - ES_{11} & \cdots & H_{1N} - ES_{1N} \\ \vdots & \ddots & \vdots \\ H_{N1} - ES_{N1} & \cdots & H_{NN} - ES_{NN} \end{vmatrix} \stackrel{!}{=} 0.$$

Using the following abbreviations:

$$n_{ij}^a = \frac{n_i a_i + n_j a_j}{2(n_i + n_j)}$$

$$Y_{ij}^a = \frac{n_i a_i^2 + n_j a_j^2}{4(n_i + n_j)} - \frac{(n_i a_i + n_j a_j)^2}{4(n_i + n_j)^2}$$

$$\omega_{ij} = n_i + n_j$$

it follows for the elements $H_{ij}$, $S_{ij}$:

$$H_{ii} = \int\int_{-\infty}^{\infty} dx dy \xi_i^2 (x^2 + y^2) = \frac{\pi}{n_i^2} + \frac{\pi}{4n_i}(a_i^2 + b_i^2)$$

$$H_{ii} = \int\int\int_{-\infty}^{\infty} dx dy dz \xi_i^2 (x^2 + y^2 + z^2) = \frac{3}{2}\frac{\pi^{\frac{3}{2}}}{n_i^{\frac{5}{2}}} + \frac{1}{4}\left(\frac{\pi}{n_i}\right)^{\frac{3}{2}}(a_i^2 + b_i^2 + d_i^2)$$

$$S_{ii} = \int\int_{-\infty}^{\infty} dx dy \xi_i^2 = \frac{\pi}{n_i}$$

$$S_{ii} = \int\int\int_{-\infty}^{\infty} dx dy dz \xi_i^2 = \left(\frac{\pi}{n_i}\right)^{\frac{3}{2}}$$

$$H_{ij} = \int\int_{-\infty}^{\infty} dx dy \xi_i (x^2 + y^2 + z^2) \xi_j$$
$$= \left[\frac{4\pi}{\omega_{ij}^2} + \frac{2\pi}{\omega_{ij}}\left((\eta_{ij}^a)^2 + (\eta_{ij}^b)^2\right)\right]e^{-\frac{1}{2}\omega_{ij}(Y_{ij}^a + Y_{ij}^b)}$$

$$H_{ij} = \int\int\int_{-\infty}^{\infty} dx dy dz \xi_i (x^2 + y^2 + z^2) \xi_j$$
$$= \left[\frac{3}{2}2^{\frac{5}{2}}\frac{\pi^{\frac{3}{2}}}{\omega_{ij}^{\frac{5}{2}}} + 2^{\frac{3}{2}}\left(\frac{\pi}{\omega_{ij}}\right)^{\frac{3}{2}}\left((\eta_{ij}^a)^2 + (\eta_{ij}^b)^2 + (\eta_{ij}^d)^2\right)\right]e^{-\frac{1}{2}\omega_{ij}(Y_{ij}^a + Y_{ij}^b + Y_{ij}^d)}$$

$$S_{ij} = \int\int_{-\infty}^{\infty} dx dy \xi_i \xi_j = \frac{2\pi}{\omega_{ij}} e^{-\frac{1}{2}\omega_{ij}(Y_{ij}^a + Y_{ij}^b)}$$

$$S_{ij} = \int\int\int_{-\infty}^{\infty} dx dy dz \xi_i \xi_j = 2^{\frac{3}{2}}\left(\frac{\pi}{\omega_{ij}}\right) e^{-\frac{1}{2}\omega_{ij}(Y_{ij}^a + Y_{ij}^b + Y_{ij}^d)}$$

These solutions allow the equation to be solved for the determinant, and thus the homogeneous system of equations to be solved for the coefficients $c_1, \ldots, c_N$. Unambiguous results may be achieved for the coefficients in the process, establishing another condition for the coefficients $c_1, \ldots, c_N$, such as a normalization:

$$\sum_{i=1}^{N} c_i^2 \stackrel{!}{=} 1.$$

According to embodiments, it is also possible to assign other values, such as $$f(c_i^2) \stackrel{!}{=} w_i \text{ or } \sum_{i=1}^{N} c_i^2 \stackrel{!}{=} w,$$

where w, $w_i \in \mathbb{R}$, to the coefficients $c_1, \ldots, c_N$.

According to embodiments, each of the control groups includes all data blocks of the first group, except for the data block to which they are assigned.

According to embodiments, the control groups that are assigned to the data blocks of a first of the control groups in each case include the data block to which the first control group is assigned. Embodiments may have the advantage that it is thus possible to implement bidirectional links between the data block to which the control group is assigned, and each data block that is included in the first control group.

According to embodiments, a respective bidirectional concatenation of the data block to which the corresponding control group is assigned, and each data block included in the control group is implemented in the case of each control group.

According to embodiments, the first group comprises three or more data blocks. Embodiments may have the advantage that a cryptographic dependency relationship may be implemented by the combination of all functions that are assigned to the data blocks of the first group, for an arbitrarily large number of data blocks via the data stored in the corresponding data blocks.

According to embodiments, at least one of the control groups includes three or more data blocks. Embodiments may have the advantage that an arbitrary number of links may be implemented for the data blocks of the first group. In this way, on the one hand, the security of the respective data blocks may be individually set, and, on the other hand, the links may be based on content relationships of the data of the mutually linked data blocks, and may thus map complex data structures. Assuming that important data has a high degree of dependence on other data or a high degree of interrelationships with other data, the present method, in generic form, may be used to directly implement a security level that is adapted to the corresponding data by mapping the interrelationships of the data by way of the links. The more data blocks a particular data block is linked to, the higher is the security level of the data of the corresponding data block.

According to embodiments, the combination is created using a connection function for connecting all functions assigned to the data blocks of the first group. Embodiments may have the advantage that the cryptographic security level may be increased as a result of the use of the connection function.

According to embodiments, the first predefined condition encompasses an extreme value condition. Embodiments may have the advantage that an effective and efficient method for determining coefficients for arbitrary data content is provided by an extreme value condition.

According to embodiments, the number of the data blocks comprised by the first group is dependent on a security level of at least one data block of the first group. Embodiments may have the advantage that the cryptographic security by which the data blocks of the first group are secured may be adapted to the security level of the at least one data block, by selecting the number of data blocks of the first group. According to embodiments, the number of the data blocks is dependent on the security level of all data blocks of the first group. For example, it may be ensured for a predefined data block that the number of the data blocks in the group to which the corresponding data block is assigned corresponds to a security level established for the corresponding data block, for example, is proportional thereto.

According to embodiments, the data blocks are assigned to the first group using a first assignment criterion. According to embodiments, the first assignment criterion encompasses an assignment of the content of the corresponding data blocks to a shared content category, an assignment of the content of the corresponding data blocks to a shared security level, an assignment of the owners of the corresponding data blocks to a shared owner group, an assignment of the content of the corresponding data blocks to a dependency relationship and/or an assignment of the owners of the corresponding data blocks to a dependency relationship.

Embodiments may have the advantage that the assignment of the data blocks of the data block structure to one or more groups may be based, for example, on commonalties or dependencies of the data content of the corresponding data blocks. In this way, the classification into groups may reflect a logical structure of the data. This may be advantageous since, in this way, a cryptographic dependence or security may also be implemented for data blocks that are related in terms of content. Furthermore, an assignment of the data blocks to groups may be advantageous with respect to the storage of the coefficients in the control groups. If a storage of the coefficients in the data blocks of the control groups requires a consent of the respective owner of the corresponding data block so as to be stored, it may be advantageous that the group is assigned to particular owners. For example, the owners may be responsible for the corresponding data and/or assigned to the same or a higher security level. The latter may be advantageous, for example, when cryptographically encrypted data is stored in the data blocks, to which only individuals or institutions with clearance for a particular security level have access. In this case, only selected owners may have access to the decrypted data and thus be enabled to check the data integrity.

With respect to the consent for storage, agreements or dependencies of the data blocks in terms of content may likewise be advantageous since owners of data blocks that include data with related content, and are thus suitable for the input of the coefficient storage, are thus responsible for the consent. The coefficient storage corresponds to an approval of or a consent to the data structure encompassed and implemented by the first group.

According to embodiments, the number of the data blocks comprising the respective control groups is dependent on a security level of the data block to which the corresponding control group is assigned.

According to embodiments, the data blocks comprising the respective control groups are determined using a second assignment criterion. According to embodiments, the second assignment criterion encompasses an assignment of the content of the corresponding data blocks to a shared content category, an assignment of the content of the corresponding data blocks to a shared security level, an assignment of the owners of the corresponding data blocks to a shared owner group, an assignment of the content of the corresponding data blocks to a dependency relationship and/or an assignment of the owners of the corresponding data blocks to a dependency relationship.

According to embodiments, at least one owner is assigned to each data block, and storing the coefficients in the data blocks in each case requires a consent of the at least one owner of the corresponding data block. Embodiments may have the advantage that a consent of the owner of the data block to store a coefficient in the corresponding data block corresponds to a consent of the owner to the data structure encompassed by the first group of data blocks. In particular, the consent of the owner represents a consent to the coefficient, and thus to the data underlying the function for which the coefficient was calculated. In other words, by consenting to the storage of the coefficient, the owner confirms the correctness of the coefficient, and thus of the applied cryptographic security procedure for securing the data blocks of the first group. In addition, by consenting to the storage of the coefficient, the owner indicates his or her agreement to the data of the data block, for the function of which the corresponding coefficient was determined.

For example, a data block includes the address of a user as data. When the address changes, the function assigned to the data block including the address changes. If the user would like to change his or her address after moving, the changed coefficient resulting from the changed function has to be stored, for example, in a data block of a control group, whose owner is a registration authority in charge of the new address or the postal service. The registration authority or the postal service only consent to the storage when an official request for an address change is present. Other service providers, such as a shipping provider, the railway authority, an airline and the like, may use the changed address in the future so as to provide their services to the user. In doing so, these may trust that the changed address is correct since this change was made, for example, with the consent of the registration authority or the postal service.

According to embodiments, the consents in each case encompass a signature of the corresponding coefficient with a private signature key of the owner of the data block to which the coefficient is to be added. Embodiments may have the advantage that, as a result of the signature, the corresponding owner may consent to the corresponding coefficient in a cryptographically secured and verifiable manner.

According to embodiments, the signature key is a private cryptographic key of an asymmetric key pair. The asymmetric key pair furthermore, for example, includes a signature verification key in the form of a public cryptographic key, associated with the private cryptographic key, for checking the signatures created by way of the signature key. For example, the signature key is stored in a protected memory area of a memory of a computer system associated with the owner of the data block.

Asymmetric key pairs are used for a plurality of crypto systems and also play an important role in the signing of electronic documents. An asymmetric key pair consists of a public key, which is used to encrypt and/or decrypt data and may be passed on to third parties, such as a service provider and/or a CSP, and a private key, which is used to encrypt and/or decrypt data and must generally be kept confidential. The public key enables anyone to encrypt data for the owner or holder of the private key, check digital signatures of his or her documents or to authenticate him or her. A private key enables its holder to decrypt data encrypted with the public key or to create digital signatures for electronic documents. A signature created with a private key may be verified with the associated public key.

Digital signatures are used for secure electronic data exchange, for example on the Internet, and make it possible to check identities and/or authorizations and the unaltered nature of the exchanged data. To ensure this, a public key infrastructure is resorted to, for example, which confirms the validity of the utilized keys by way of certificates.

The creation of a digital signature, hereafter also simply referred to as "signature," is a cryptographic process during which another data value, referred to as "signature," is calculated for arbitrary data, for example a coefficient. The signature may, for example, be an encrypted hash value of the coefficient, and in particular a hash value encrypted with a private key of a cryptographic key pair associated with a certificate.

The special characteristic of such a signature is that the creatorship thereof and association thereof with a particular person or authority may be checked by any third party.

According to embodiments, the owners of the data blocks in each case have an exclusive write permission for adding data to the particular data blocks. Embodiments may have the advantage that it may be assured that a consent of the owners for storing the coefficients is in fact available. The security of the method may be increased by the above-described security mechanisms for ensuring that only coefficients for which a consent from the relevant owner or the relevant authorities is available are stored in the data blocks.

According to embodiments, the method for checking the data integrity of one of the data blocks of the first group of data blocks furthermore comprises:
  determining the functions assigned to the data blocks of the first group;
  creating the first combination of all functions assigned to the data blocks of the first group;
  determining the combination-dependent coefficient for the function of the data block to be checked as a check coefficient so that the first combination meets a first predefined condition;
  comparing the check coefficient to the coefficients stored in the data blocks of the control group of the data block to be checked for the function of the corresponding data block; and
  confirming the data integrity of the data block to be checked when a predefined agreement criterion between the check coefficient and the stored coefficients is met.

Embodiments may have the advantage that they allow the data integrity of one or more data blocks of the first group to be checked efficiently and effectively. In particular, the method allows the data integrity of all data blocks of the first group to be checked simultaneously.

According to embodiments, the predefined agreement criterion is met when there is identity between the check coefficient and at least one of the stored coefficients. Embodiments may have the advantage that the agreement criterion requires, for example, identity between the check coefficient and a particular minimum number of stored coefficients. In this way, it is possible to confirm the data integrity even when individual owners have not consented to storing the coefficients, for example due to technical difficulties, or this allows a chronological successive consent to the coefficients, without thereby inhibiting the ability of the system to operate. This may be advantageous, for example, when owners of individual data blocks and/or individual data blocks are not reachable, for example in the case of a distributed storage of the data blocks among different storage systems and/or in the case of partial damage of the stored data blocks.

According to embodiments, the predefined agreement criterion is met when there is identity between the check coefficient and all stored coefficients. Embodiments may have the advantage that a maximum degree of security may be ensured when checking the data blocks. The larger the number of stored coefficients, the greater the resulting degree of security may be.

According to embodiments, the data integrity of all data blocks of the first group is checked.

According to embodiments, the method for checking the data integrity of the data blocks of the first group of data blocks furthermore comprises:
  determining the functions assigned to the data blocks of the first group;
  creating the first combination of all functions assigned to the data blocks of the first group;
  checking whether the created first combination with the coefficients stored in the data blocks of the control groups of the first group meets the first predefined condition; and
  confirming the data integrity of the data blocks of the first group when the first predefined condition is met.

Embodiments may be advantageous since these provide an effective and efficient method for checking the data integrity.

According to embodiments, the data integrity is checked prior to data being read out from one or more data blocks of the first group, at least for the data blocks from which data is being read out. Embodiments may have the advantage that, by automatically checking the data integrity prior to data being read out from one of the data blocks of the first group, it may be ensured that the read-out data has not been manipulated.

According to embodiments, the method furthermore comprises:
  altering the data of a data block of the first group;
  determining an updated function, which is assigned to the changed data block and dependent on the changed data of the changed data block;
  creating an updated combination of all functions assigned to the data blocks of the first group, the updated combination including the updated function for the changed data block;
  determining an updated combination-dependent coefficient for each function of the updated combination so that the updated combination meets the first predefined condition; and
  replacing each of the coefficients stored in the data blocks of the control groups of the first group which were determined for the first combination with an updated coefficient which was determined for the updated combination.

Embodiments may have the advantage that the present method allows data in the data blocks to be altered. At the same time, the cryptographically secured integrity of the data remains ensured. In particular, the requirement of consenting to the storage of coefficients may help ensure that only permissible alterations are made to the data, and corresponding data alterations do not represent any unlawful manipulation of the data.

According to embodiments, the method furthermore comprises:
  determining a data block of the first group to be deleted;
  deleting the coefficients of the function of the data block to be deleted in the data blocks of the control groups of the data block to be deleted;
  deleting the data block to be deleted;
  creating an updated combination of all functions assigned to the remaining data blocks of the first group;
  determining an updated combination-dependent coefficient for each function of the updated combination so that the updated combination meets the first predefined condition; and
  replacing each of the coefficients stored in the remaining data blocks of the control groups of the first group which were determined for the first combination with an updated coefficient which was determined for the updated combination.

Embodiments may have the advantage that it is not only possible to alter, that is, to add, replace and/or delete, data in data blocks, but rather to delete entire data blocks, without calling the cryptographic securing of the data block structure into question.

According to embodiments, the method furthermore comprises:
  adding an additional data block to the first group of data blocks;
  determining an additional function, which is assigned to the additional data block and dependent on the data of the additional data block;
  creating an expanded combination of all functions assigned to the data blocks of the first group, from the first combination and the additional function;
  determining an expanded combination-dependent coefficient for each function of the expanded combination so that the expanded combination meets the first predefined condition;
  replacing each of the coefficients stored in the data blocks of the control groups of the first group which were determined for the first combination with an expanded coefficient which was determined for the expanded combination;
  determining an additional control group of data blocks of the first group for the additional data block; and
  storing the expanded coefficient determined for the additional function of the additional data block in all data blocks of the additional control group.

Embodiments may have the advantage that the data block structure may be expanded by additional blocks, without calling the cryptographic security into question.

According to embodiments, the method for mutually concatenating all data blocks of a second group of data blocks, so that each data block of the second group is dependent on all other data blocks of the second group, furthermore comprises:
  for the second group of data blocks:
    determining the functions assigned to the data blocks of the second group;
    creating a second combination of all functions assigned to the data blocks of the second group; and
    determining a combination-dependent coefficient for each function of the second combination so that the second combination meets a first predefined condition;
  for each data block of the second group:
    determining a control group of data blocks of the second group which is assigned to the corresponding data block; and storing the coefficient that was determined for the function of the corresponding data block in all data blocks of the control group.

Embodiments may have the advantage that the data block structure may comprise a plurality of groups of data blocks. These groups may partially overlap, that is, comprise shared data blocks. When one of these shared data blocks is altered, the cryptographic securing of both groups, that is, the stored coefficients of both groups, must be adapted to the change. When a data block that is only assigned to a single of these groups of data blocks is altered, only the cryptographic securing of this one group must be adapted to the change. In other words, only the coefficients of this one group must be changed. Further groups overlapping the corresponding group are not affected by the change with respect to their own cryptographic security.

According to embodiments, the second group of data blocks comprises some of the data blocks of the first group of data blocks. According to embodiments, the second group of data blocks comprises all data blocks of the first group of data blocks.

According to embodiments, for three or more groups of data blocks, the data blocks of the respective group are mutually concatenated in such a way that each data block of the corresponding group is dependent on all other data blocks of the corresponding group, wherein the individual groups in succession include at least one data block of the preceding group in the sequence, and the last group of the sequence is the predecessor group of the first group of the sequence, so that the data blocks of each of the three or more groups are dependent on the data blocks of all other groups. Two data blocks are dependent on one another when an alteration of the data of a first of the two data blocks causes, or may cause, a change of a coefficient of a function which is dependent on the data stored in the second of the two data blocks.

According to embodiments, for four or more groups of data blocks, the data blocks of the respective group are mutually concatenated in such a way that each data block of the corresponding group is dependent on all other data blocks of the corresponding group, wherein one of the four or more groups includes at least one data block of all further of the four or more groups, so that the data blocks of each of the four or more groups are dependent on the data blocks of all other groups.

Embodiments may have the advantage that a plurality of different linking structures may be implemented, for example annular links or star-shaped links.

According to embodiments, the data to be stored in a data block and/or the data to be altered in a data block encompasses data that is characteristic of the content of a digitally encoded document, wherein the data is received, using a communication interface, via a network from a computer system creating the digitally encoded document. According to embodiments, the method furthermore comprises:
receiving a request for a current version of one or more data blocks of the data block structure, an updated group of data blocks of the data block structure, or the entire updated data block structure, using the communication interface, via the network from a requesting computer system; and
transmitting the updated one or more data blocks of the data block structure, the updated group of data blocks of the data block structure, or the entire updated data block structure, using the communication interface, via the network to the requesting computer system in response to the received request.

Embodiments may have the advantage that the integrity of a digitally encoded document may be checked based on the data stored in the data block structure. For a present digitally encoded document, data that is characteristic of the content of this document may be calculated. For example, a hash value of the content of the digitally encoded document may be calculated. This data may be compared to the data block structure: If the data block structure includes the corresponding data, the integrity of the digitally encoded document is confirmed, and the document is acknowledged as authentic. If the data block structure does not include the corresponding data, the integrity of the digitally encoded document is denied. The data block structure may offer the advantage that the size thereof may be kept compact when the data block structure only includes hash values of the digitally encoded documents. Furthermore, it is not possible to infer the contents of the corresponding documents based on the hash values of the digitally encoded documents, thereby further increasing security. Finally, a current version of the data block structure may, for example, be downloaded via the network onto a portable mobile telecommunications device, and be used to check digitally encoded documents, even if no network link is available, that is, the portable mobile telecommunications device is in offline mode.

A "document" shall, in particular, be understood to mean a news message, a text, a record, a credential or an identification, value or security document, in particular a document from a governing body, in particular a paper-based and/or plastic-based document, such as an electronic identification document, in particular a passport, an identification card, a visa, a driver's license, a vehicle registration, a vehicle title, a health insurance card or a company ID card, or another ID document, a chip card, a payment instrument, in particular a bank note, a bank card or a credit card, a bill of lading or other proof of authority. In particular, the document may be a machine-readable travel document, such as are standardized by the International Civil Aviation Organization (ICAO) and/or the German Federal Office for Information Security (BSI). A record is a declaration in text or written form which documents a particular statement of facts or presentation of facts. Moreover, the record may identify the issuer of the record.

A digitally encoded document shall be understood to mean a data construct for electronic data processing which comprises digitally encoded data. This may, in particular, be an electronic file having an arbitrary data format, such as a text, table, sound, image and/or video file. According to embodiments, the electronic file may be executable or non-executable. A digitally encoded document may, for example, be a document that was created in or translated into a file form by digitizing a document having a physical document body, that is, a conversion of the data encompassed by the physical document body into a binary code. In particular, the validity of such a document is independent from the existence of a permanently associated document body.

According to embodiments, a digitally encoded document may be created, for example, by generating a file including the data of the corresponding document on a computer. Furthermore, a digitally encoded document may, for example, also be created by scanning or photocopying a physical document body, such as a document on paper.

According to embodiments, the data to be stored in a data block and/or the data to be altered in a data block encompasses data of a transaction, wherein the data is received, using a communication interface, via a network from a computer system involved in carrying out the transaction. According to embodiments, the method furthermore comprises:

receiving a request for a current version of one or more data blocks of the data block structure, an updated group of data blocks of the data block structure, or the entire updated data block structure, using the communication interface, via the network from a requesting computer system; and transmitting the updated one or more data blocks of the data block structure, the updated group of data blocks of the data block structure, or the entire updated data block structure, using the communication interface, via the network to the requesting computer system in response to the received request.

Embodiments may have the advantage that transactions may be logged based on the data recorded in the data block structure. The transactions may, for example, be transactions of a cryptocurrency or of a traditional currency, a sale, a shipment, a conveyance of property or a transfer of an item and/or of a digitally encoded document.

According to embodiments, the data to be stored in a data block and/or the data to be altered in a data block encompasses status data of a device, wherein the data is received, using a communication interface, via a network from a computer system detecting the status data by way of a sensor. According to embodiments, the method furthermore comprises:

receiving a request for a current version of one or more data blocks of the data block structure, an updated group of data blocks of the data block structure, or the entire updated data block structure, using the communication interface, via the network from a requesting computer system; and transmitting the updated one or more data blocks of the data block structure, the updated group of data blocks of the data block structure, or the entire updated data block structure, using the communication interface, via the network to the requesting computer system in response to the received request.

Embodiments may have the advantage that the status and/or the status history of a device may be logged based on the status data stored in the data block structure. For example, such a device may be a production device, a component of a computer system, a locking system, an access control device or a vehicle. A "vehicle" shall be understood to mean a mobile means of transportation here. Such a means of transportation may be used, for example, to transport goods (freight traffic), tools (machinery or auxiliary devices) or persons (passenger traffic). Vehicles also include, in particular, motor- or engine-driven means of transportation. For example, a vehicle may be a land vehicle, a watercraft and/or an aircraft. A land vehicle may be, for example: an automobile, such as a passenger car, a bus or a truck, a motor-powered two-wheeler, such as a motorcycle, a moped, a motor scooter or a motor-driven bicycle, an agricultural tractor, a forklift truck, a golf cart or a truck-mounted crane. A land vehicle may moreover also be a rail-bound vehicle. A watercraft may be, for example: a ship or a boat. Furthermore, an aircraft may be, for example: an airplane or a helicopter. A vehicle shall, in particular, also be understood to mean a motor vehicle.

A "sensor" shall be understood to mean an element for detecting measuring data here. Measuring data is data that qualitatively or quantitatively expresses physical or chemical properties of a measuring object, such as amount of heat, temperature, moisture, pressure, sound field variables, electromagnetic field strength, brightness, acceleration, change in position, pH value, ionic strength, electrochemical potential, and/or the material makeup thereof. Measuring data is detected by way of physical or chemical effects and converted into an electronically processable electrical signal. Moreover, measuring data may express statuses and/or changes in the status of electronic devices, for example as a result of a use by a user.

According to embodiments, the status data may also include data about functions that are carried out by the device. For example, in this way it is possible to log manufacturing and/or processing operations carried out by a production device. Furthermore, it is possible to log actions of an access control device, wherein the logged data may include information as to who gained access to a secured area via the access control device, and when.

Embodiments relate to an electronic data storage system for storing data in a tamper-proof manner in an electronic memory of the data storage system, using a data block structure comprising a plurality of data blocks, wherein each of the data blocks is assigned a function that is dependent on the data stored in the corresponding data block, wherein the data storage system comprises a processor, and machine-readable instructions are stored in the electronic memory, wherein an execution of the machine-readable instructions by the processor prompts the data storage system to carry out a method for mutually concatenating all data blocks of a group of data blocks, so that each data block of the group is dependent on all other data blocks of the group, comprising:

for the group of data blocks:
  determining the functions assigned to the data blocks of the group;
  creating a combination of all functions assigned to the data blocks of the group; and
  determining a combination-dependent coefficient for each function of the combination so that the combination meets a predefined condition;

for each data block of the group:
  determining a control group of data blocks of the group which is assigned to the corresponding data block; and
  storing the coefficient that was determined for the function of the corresponding data block in all data blocks of the control group.

According to embodiments, the electronic data storage system is configured to carry out one or more of the aforementioned embodiments of the method for storing data in a tamper-proof manner.

According to embodiments, the electronic data storage system comprises a file system. The file system provides organized filing on the data memory. Data, such as digitally encoded documents, may be stored on the data memory as files. Furthermore, the files may be read, modified or deleted.

According to embodiments, the electronic data storage system comprises a database. A database or a database system refers to a system for electronic data management. A database system allows large volumes of data to be stored efficiently, consistently and permanently, and required subsets to be provided in various demand-based forms of representation for users and application programs. The database system comprises, for example, a database management system and a database in the narrower sense, or a data platform. The database management system provides management software for managing data of the database. The management software internally organizes the structured storage of the data and controls all read and write access to the database. The data platform encompasses the volume of data to be managed. Data, such as digitally encoded documents, for example, is stored as part of the data platform in this case.

The memory may comprise a removable memory, for example, that is, a data carrier for a computer system which is not fixedly installed, replaceable and/or portable. For example, removable storage devices include Blu-ray discs, CDs, diskettes, DVDs, HD DVDs, magnetic tapes, MO/MODs, solid state drives (SSDs), memory cards, USB sticks or removable hard disks.

Embodiments relate to a telecommunications system, which comprises an electronic data storage system according to any one of the aforementioned embodiments, and a communication interface for communicating via a network, wherein at least one of the data blocks of the first group is a data block additionally added to the first group, including data to be stored in the data block structure, wherein the data storage system is configured to carry out the method for mutually concatenating the data blocks in response to receiving the data to be stored by way of the communication interface via the network.

For example, the telecommunications system is a computer system configured to communicate via a network.

A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet. Furthermore, it may be a digital cellular mobile communication network, for example. The telecommunications system may comprise a mobile communication device, such as a smart phone, and/or be configured to communicate with a mobile communication device via a digital cellular mobile communication network.

A "computer system" here shall be understood to mean a device processing data by way of programmable processing rules using electronic circuits. A "program" or "program instructions" here shall be understood to mean any type of computer program, without restriction, that includes machine-readable instructions for controlling a functionality of the computer.

A computer system may comprise an interface for connecting to the network, wherein the network may be a private or public network, and in particular the Internet or another communication network. Depending on the embodiment, this connection may also be established via a mobile communication network.

A computer system may, for example, be a mobile telecommunications device, and in particular a smart phone, a portable computer, such as a laptop or palmtop computer, a personal digital assistant or the like. Furthermore, this may be a smart watch or smart glasses, for example. Moreover, this may be a stationary computer system, such as a personal computer, for example, or a server integrated in a client server environment. In particular, this may be a server comprising a database management system, which manages a database including a data block structure.

A "memory" or "data memory" here shall be understood to mean both volatile and non-volatile electronic memories, and digital storage media.

A "non-volatile memory" here shall be understood to mean an electronic memory for permanently storing data. A non-volatile memory may be configured as a non-changeable memory, which is also referred to as ready-only memory (ROM) or as a changeable memory, which is referred to simply as a non-volatile memory (NVM). In particular, this may be an EEPROM, for example a flash EEPROM, referred to as flash for short. A non-volatile memory is characterized in that the data stored therein is preserved even after the power supply is turned off.

A "volatile electronic memory" here shall be understood to mean a memory for temporarily storing data, which is characterized in that all the data is lost after the power supply is turned off. In particular, this may be a volatile direct access memory, which is also referred to as random access memory (RAM), or a volatile main memory of the processor.

A "processor" here and hereafter shall be understood to mean a logic circuit used to execute program instructions. The logic circuit may be implemented on one or more discrete components, and in particular on a chip. In particular, a "processor" shall be understood to mean a microprocessor or a microprocessor system comprising multiple processor cores and/or multiple microprocessors.

An "interface" or "communication interface" here shall be understood to mean an interface via which data may be received and sent, wherein the communication interface may be configured to be equipped with contacts or in a contactless manner. The communication interface may be an internal interface or an external interface, which is connected to an associated device by means of a cable or wirelessly, for example. A communication interface for wireless communication shall be understood to mean a communication interface configured to send and receive data in a contactless manner. The communication may take place according to an RFID and/or NFC standard, such as Bluetooth, for example. Furthermore, the communication interface may be configured for communicating via a local wireless network, for example according to a standard of the IEEE-802.11 family and/or Wifi.

An interface may be configured as a wireless interface, for example, which enables communication via a digital cellular mobile communication network, which may be composed according to a wireless communication standard, such as GSM, UMTS, LTE, CDMA or another standard.

Communication may generally take place via a network, for example. A "network" here shall be understood to mean any transmission medium having a connection for communication which enables communication between at least two computer systems. A network may, for example, encompass a local network, in particular a local area network (LAN), a private network, in particular an Intranet, or a virtual private network (VPN). For example, the computer system may comprise a standard radio interface for connection to a WLAN. Furthermore, it may be a public network, such as the Internet.

According to embodiments, machine-readable instructions are furthermore stored in the electronic memory of the telecommunications system, the execution of which by the processor prompts the data storage system to carry out a method comprising:
  receiving a request for at least a portion of a data block of
    the group of data blocks from a requesting telecommunications system by way of the communication
    interface via the network;
  checking the data integrity of the requested data block, the
    integrity check comprising:
    determining the functions assigned to the data blocks of
      the group;
    creating the first combination of all functions assigned
      to the data blocks of the group;

determining the combination-dependent coefficient for the function of the data block to be checked as a check coefficient so that the combination meets the predefined condition;

comparing the check coefficient to the coefficients stored in the data blocks of the control group of the data block to be checked for the function of the corresponding data block; and confirming the data integrity of the data block to be checked when a predefined agreement criterion between the check coefficient and the stored coefficients is met;

upon confirmation of the data integrity, transmitting the requested portion of the data block and a confirmation message for confirming the data integrity of the requested data block by way of the communication interface via the network to the requesting telecommunications system, in response to the received request.

Embodiments of the invention will be described in more detail hereafter with reference to the drawings. In the drawings:

FIGS. 1A, 1B, 1C, and 1D show schematic block diagrams of exemplary data block structures;

Elements of the following embodiments that correspond to each other are denoted by the same reference numerals.

Figure 1A:
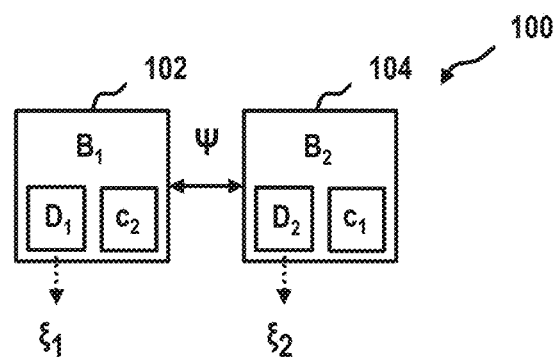

FIGS. 1A to 1D show exemplary data block structures 100. The data block structure 100 shown in FIG. 1A comprises two data blocks 102, 104. The data block 102 includes data $D_1$, and the data block 104 includes data $D_2$. A function $\xi_1$, which is dependent on the data $D_1$, is assigned to data block 102, and a function $\xi_2$, which is dependent on the data $D_2$, is assigned to data block 104. The data blocks 102, 104 of the data structure 100 form a group. The data blocks 102, 104 of the group are cryptographically secured by creating a combination $\psi$ of the functions $\xi_1$, $\xi_2$, wherein the combination represents a connection of all data blocks 102, 104 of the group. For example, the connection is a linear combination of the functions $\xi_1$, $\xi_2$. Coefficients $c_1$, $c_2$ are determined for the combination or connection, such as $\psi = \sum_{i=1}^{2} c_i \xi_i$. In the present case, the control groups are each composed of one data block, for example. The control group of the data block 102 is provided by the data block 104, and the control group of the data block 104 is provided by the data block 102. As a result, the coefficient $c_1$ of the function $\xi_1$ is stored in the data block 104, and the coefficient $c_2$ is stored in the data block 102. The data integrity of the data blocks 102, 104 may be checked based on the combination of the functions $\xi_1$, $\xi_2$. When the combination, using the coefficients $c_1$, $c_2$, meets a condition that is predefined for the combination, such as an extreme value condition, the integrity of the data $D_1$, $D_2$ is confirmed.

Figure 1B:
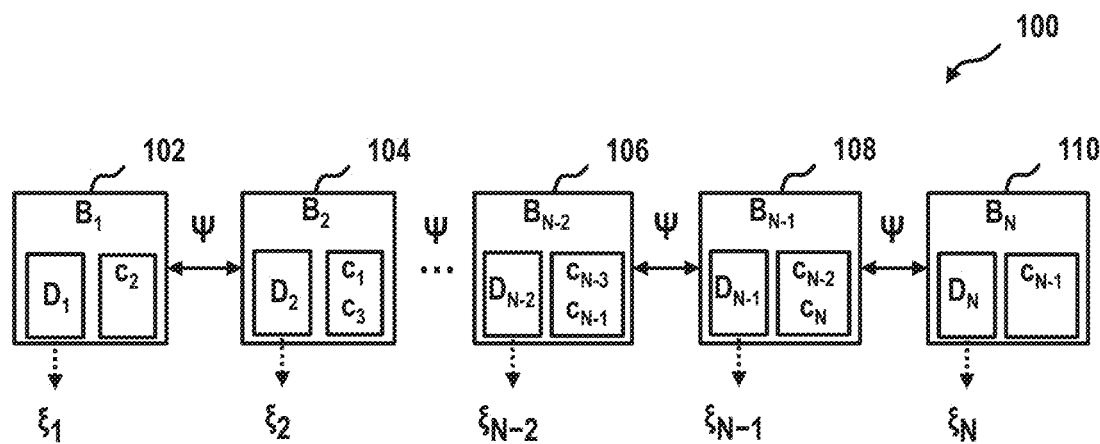

FIG. 1B shows another exemplary embodiment of a data block structure 100. The shown data block structure 100 is a linear data block structure comprising a plurality of N data blocks 102 to 110. Data $D_1$ to $D_N$ is stored in the N data blocks 102 to 110 of the data block structure 100. For example, all data blocks in the data structure 100 are assigned to one group. Furthermore, a respective function $\xi_1$ to $\xi_N$, which is dependent on the data of the corresponding data block, is assigned to each of the data blocks 102 to 110. A combination $\psi$, for example a linear combination $\psi = \sum_{i=1}^{N} c_i \xi_i$, may be created from the functions $\xi_1$ to $\xi_N$ of the data blocks 102 to 110, which is to meet a predefined condition, such as an extreme value condition. Coefficients $c_1$ to $c_N$ are determined for each of the functions $\xi_1$ to $\xi_N$ of the data blocks 102 to 110, for which the combination $\psi$ of the functions meets the predefined condition. For example, the control groups for the individual blocks 102 to 110 of the data block structure 100 are formed in each case by the two neighboring data blocks. For example, the control group for the data block 108 is formed by the data blocks 106, 110. The control group for the data block 102 is formed by the data block 104, for example. The respective coefficients $c_1$ to $c_N$ are stored in the data blocks of the assigned control group and are thus provided for a later examination or check of the data integrity. The bidirectional nature of the link becomes evident from the shown reciprocal storage of the coefficients $c_1$ to $c_N$ of neighboring data blocks.

Figure 1C:
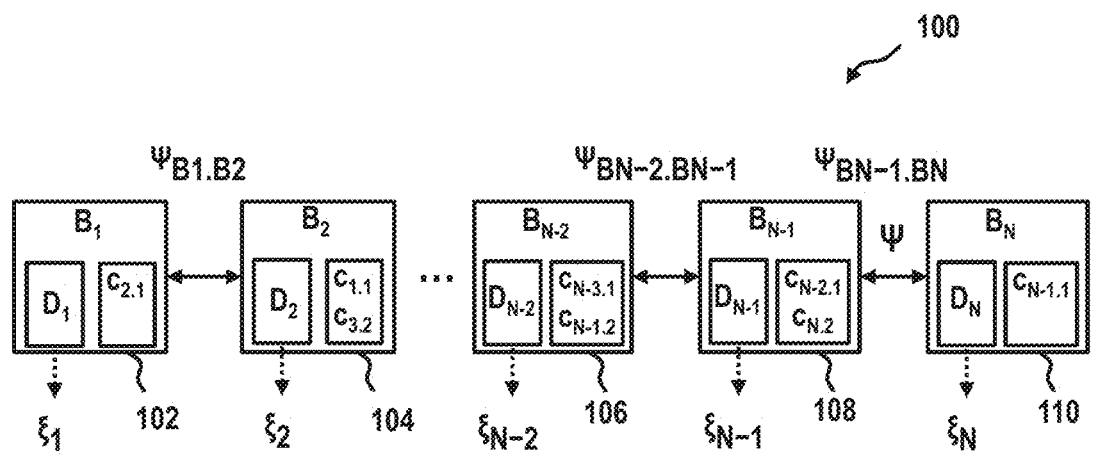

FIG. 1C shows an alternative embodiment of FIG. 1B. The data block structure 100 of FIG. 1C is identical to the data block structure of FIG. 1B. However, not all data blocks are assigned to one group in the case of FIG. 1C. Rather, the data blocks are each assigned in pairs to individual groups, wherein each of the inner data blocks 104 to 108 is assigned to two groups, while the outer data blocks 102, 110 are only assigned to one group. A combination $\psi_{B1.B2}$ to $\psi_{BN-1.BN}$ of functions $\xi_1$ to $\xi_N$ is assigned to each group. Furthermore, in each case, all groups of the data block structure 100 overlap in one data block with another group. The difference between the cryptographic securing according to FIG. 1B and the cryptographic securing according to FIG. 1C is that, in the case of FIG. 1B, altering the data $D_1$ of block 102 causes the cryptographic securing of the associated group, that is, all data blocks of the data structure 100, to be adapted accordingly. In other words, all coefficients $c_1$ to $c_N$ have to be re-calculated and updated. In the case of FIG. 1C, the group belonging to block 102 only comprises the data blocks 102, 104, which are secured by a group-individual combination $\psi_{B1.B2}$ of the functions $\xi_1$, $\xi_2$. Consequently, when the data $D_1$ of the data block 102 is altered, only the cryptographic securing of the group of the data blocks 102, 104, that is, the coefficients $c_{1.1}$, $c_{2.1}$, have to be changed. In the case of the last group having the combination $\psi_{BN-1.BN}$, the coefficients $c_{N-1.1}$, $c_{N.2}$ would have to be changed. In the case of all other groups having the combinations $\psi_{BN-i-1.BN-i}$ where $i \in [1;N-3]$, the coefficients $c_{N-i-1.1}$, $c_{N-1.2}$ would have to be changed.

Figure 1D:
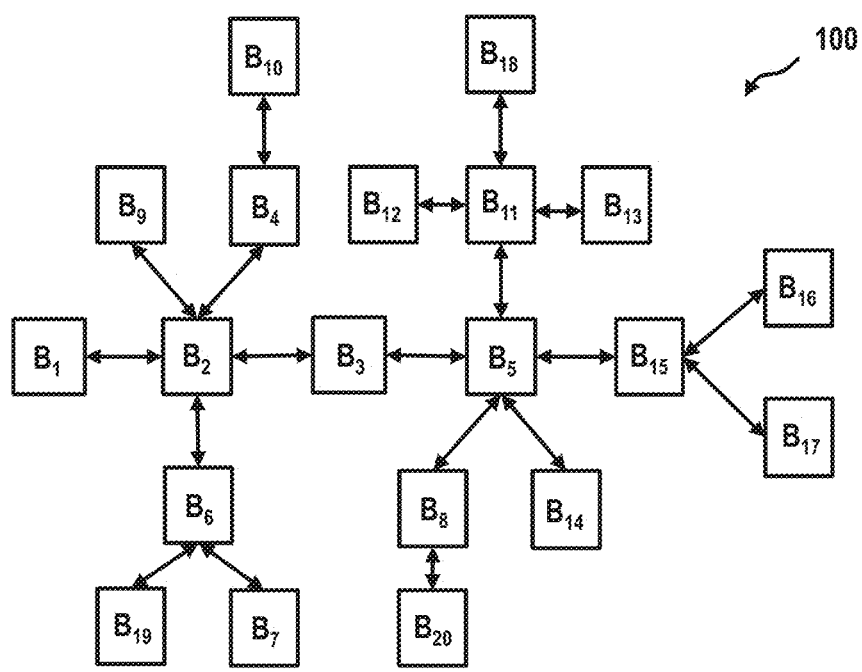

FIG. 1D finally shows another embodiment of an exemplary data block structure 100, which comprises a plurality of data blocks $B_1$ to $B_{20}$. The data blocks $B_1$ to $B_{20}$ are numbered in the sequence in which these were added to the data block structure 100. In particular, individual data blocks comprise a plurality of more than two neighboring data blocks, which belong to the control group of the corresponding data block. In the shown illustration, each of the data blocks $B_1$ to $B_{20}$ is connected by arrows to the data blocks of the control group assigned to it. For example, the control group of the data block $B_2$ includes the data blocks $B_1$, $B_3$, $B_4$, $B_6$ and $B_9$. The control group of the data block $B_3$ includes the data blocks $B_2$ and $B_5$. The control group of the data block $B_9$ includes the data block $B_2$. On the one hand, such complex linking structures may be used to map dependencies of the data in terms of content. Data blocks such as $B_5$, which include more highly interlinked data, in this case have more links or connections to neighboring data blocks or have more neighboring blocks than less highly linked data blocks, such as $B_{16}$ or $B_{19}$. This may furthermore have the advantage that the higher number of links enhances the security of the corresponding data since the coefficients of the function of the corresponding data block are stored in a higher number of neighboring blocks, as a result of which more backup copies of the corresponding coefficients exist.

Figure 2:
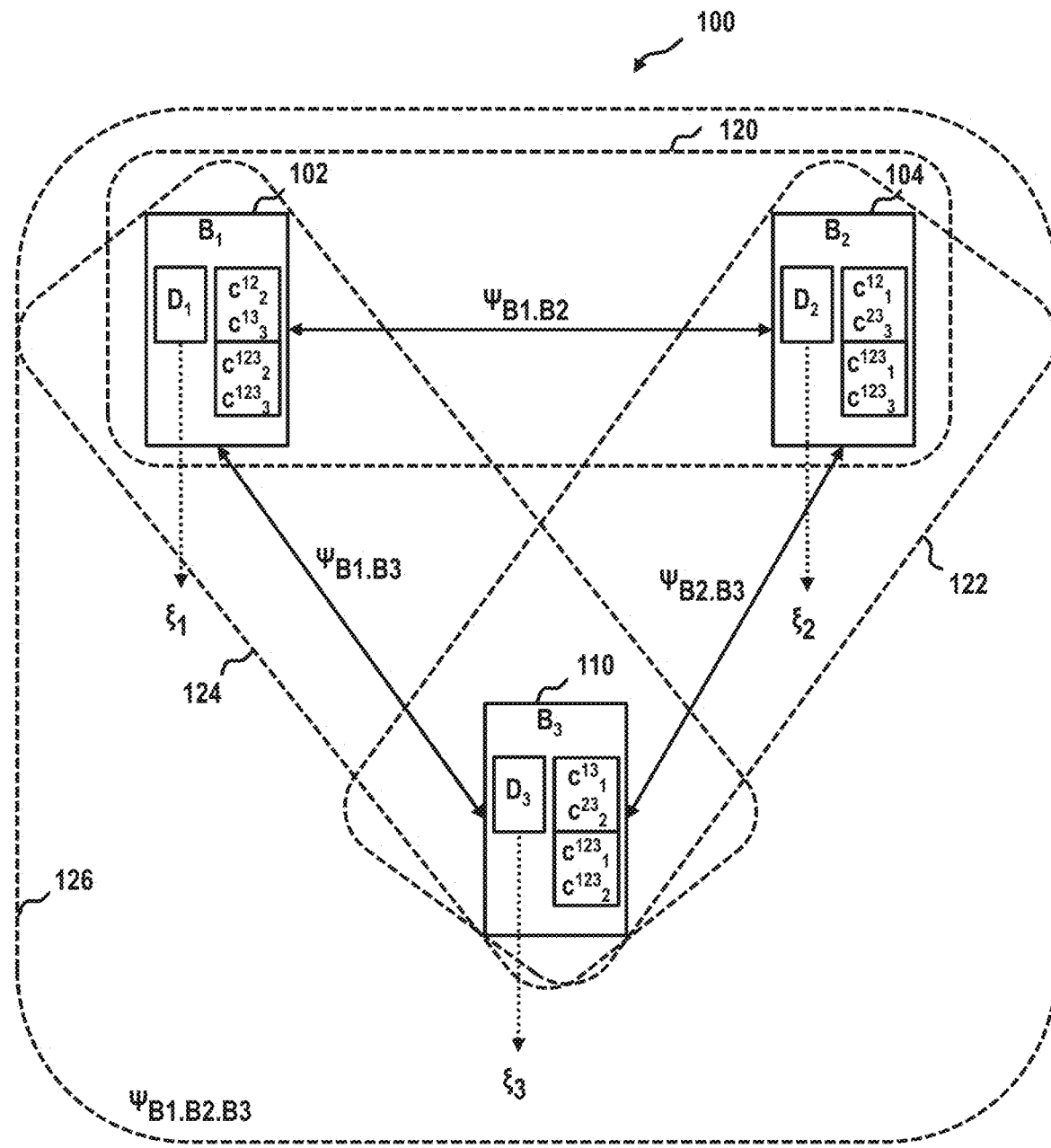
FIG. 2 shows a schematic block diagram of a further exemplary data block structure.

FIG. 2 shows another exemplary embodiment of a data block structure 100 comprising three data blocks 102, 104, 106. The shown data block structure 100 comprises three groups 120, 122, 124, for example. The group 120 includes the data blocks 102, 104. The group 122 includes the data blocks 104, 106. The group 124 includes the data blocks 102, 106. Each of the data blocks 102 to 106 includes data $D_1$ to $D_3$. For each of the groups 120 to 124, which each include a pair of data blocks, a respective connection $\psi_{B1.B2}$, $\psi_{B1.B3}$, $\psi_{B2.B3}$, for example in the form of a linear combination $\psi_{Bk.Bl} = \sum_{m=k,l} c_m^{kl} \xi_m$, of all these data blocks is determined from the functions $\xi_1$, $\xi_2$, $\xi_3$ of the corresponding data blocks. The coefficients $c_m^{kl}$ where m=k, l of the corresponding connections, for example linear combination, between the data blocks $B_k$ and $B_l$ are stored in the data blocks of the associated control groups. The data blocks of a group in each case reciprocally form the control groups thereof. If, for example, the data $D_1$ of the data block 102 is now altered, the coefficients $c_1^{12}$, $c_2^{12}$ and $c_1^{13}$, $c_3^{13}$ must be changed. As an alternative or in addition, the data block structure 100 may comprise a group 126, which includes all data blocks 102 to 106. The connection $\psi_{B1.B2.B3}$ of this group cryptographically connects all data blocks 102 to 106 to one another. For example, the control group for data block 102 with respect to group 126 is formed by the data blocks 104, 106, the control group for data block 104 is formed by the data blocks 102, 106, and the control group for the data block 106 is formed by the data blocks 102, 104. If the data of a single data block of the group 106, that is, of a single one of the data blocks 102 to 106, is altered, the cryptographic securing of the entire data block structure 100 must be adapted to the change, whereby the corresponding change is confirmed and cryptographically secured. In other words, coefficients $c_1^{123}$, $c_2^{123}$, $c_3^{123}$ in all data blocks 102 to 106 must be changed. The same applies if an additional data block is to be added to the group 100, or one of the data blocks 102 to 106 is to be removed from the group 126.

Figure 3:
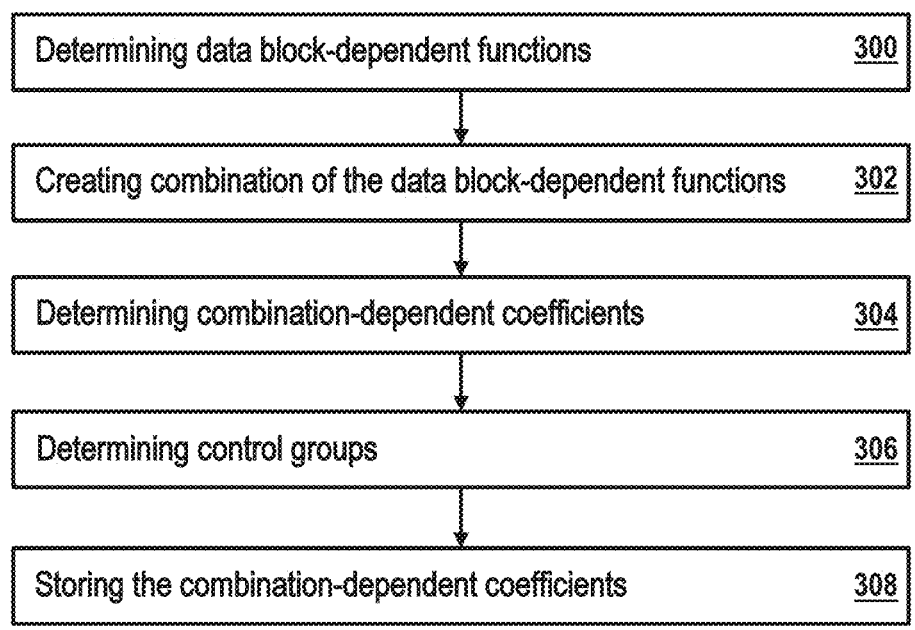
FIG. 3 shows a schematic flow chart of an exemplary method for creating a data block structure.

FIG. 3 shows an exemplary method for mutually concatenating the data blocks of a group of data blocks of a data block structure. In step 300, a function, which depends on the content of the data stored in the data block, is determined for each of the data blocks of the group. In step 302, a combination of the corresponding functions assigned to the data blocks of the group is created. In step 304, a combination-dependent coefficient is determined for each of the functions so that the combination meets a predefined condition. The combination may encompass a linear combination of the functions, for example. Furthermore, the predefined condition may be an extreme value condition, for example. In step 306, a control group of data blocks which is assigned to the data blocks is determined for each of the data blocks. In step 308, the coefficients that were determined for the function of the corresponding data block are stored in the data blocks of the control group. In this way, a cryptographic dependence of all data stored in the data blocks of the group is implemented by way of the coefficients additionally stored in the data blocks. The data blocks of the control group furthermore represent neighboring blocks of the data block to which the control group is assigned. The number of links of the data block to which the control group is assigned corresponds to the number of the data blocks comprised by the control group.

Figure 4:
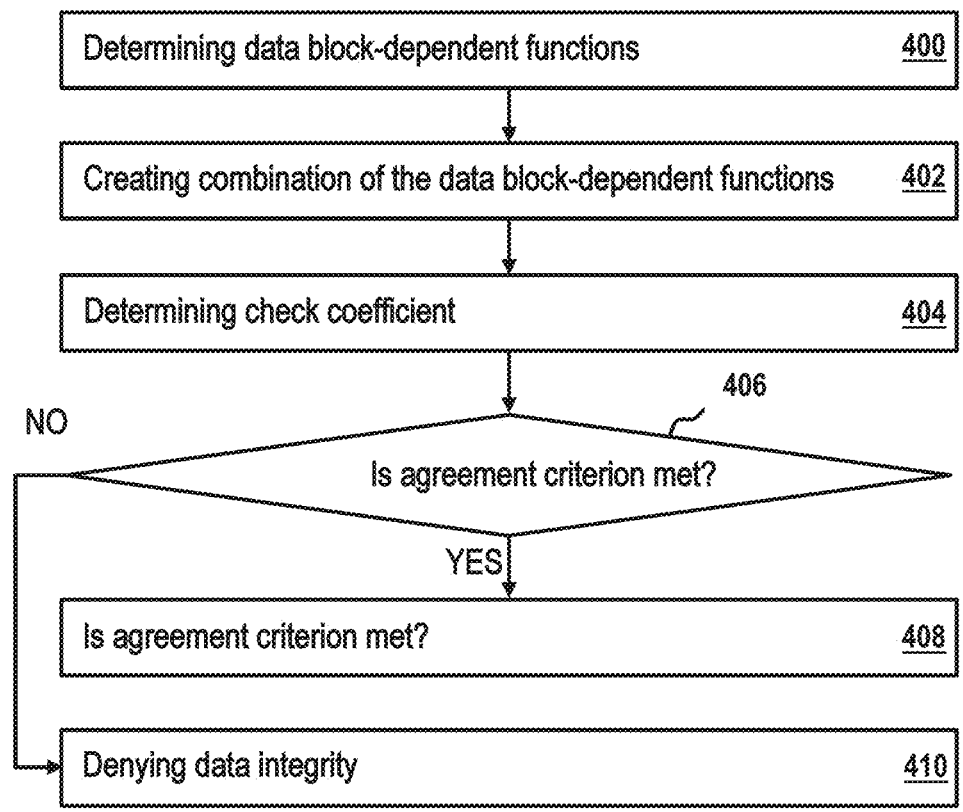
FIG. 4 shows a schematic flow chart of an exemplary method for checking a data block structure.

FIG. 4 shows an exemplary method for checking the data integrity of a data block of a group of data blocks. In step 400, a function that is dependent on the data stored in the respective data block is determined for each of the data blocks of the group. In step 402, a combination of the determined functions of all data blocks of the group is created. In step 404, a combination-dependent coefficient is determined for the function of the data block to be checked as a check coefficient so that the combination of the functions meets a predefined condition. In step 406, the check coefficient is compared to the coefficients stored in the data blocks of the control group of the data block to be checked for the function of the data block to be checked. The data integrity is confirmed in step 408 when a predefined agreement criterion between the check coefficient and the stored coefficients is met. For example, a corresponding confirmation signal is created. If the predefined agreement criterion is not met, the data integrity is denied in step 410. For example, a corresponding warning signal or an error message is created. According to embodiments, the agreement criterion is met when a predefined minimum number of stored coefficients agree with the check coefficient, for example at least one stored coefficient. According to further embodiments, the predefined agreement criterion is met when all stored coefficients agree with the check coefficient.

According to embodiments, the data integrity of a plurality of data blocks of the first group and/or of all data blocks of the first group is checked. For this purpose, combination-dependent coefficients for the functions of the corresponding plurality of data blocks to be checked and/or of all data blocks of the group are determined in step 404. The comparison according to steps 406 to 410 is carried out, in this case, for all data blocks of the plurality of data blocks and/or for all data blocks of the group.

Figure 5:
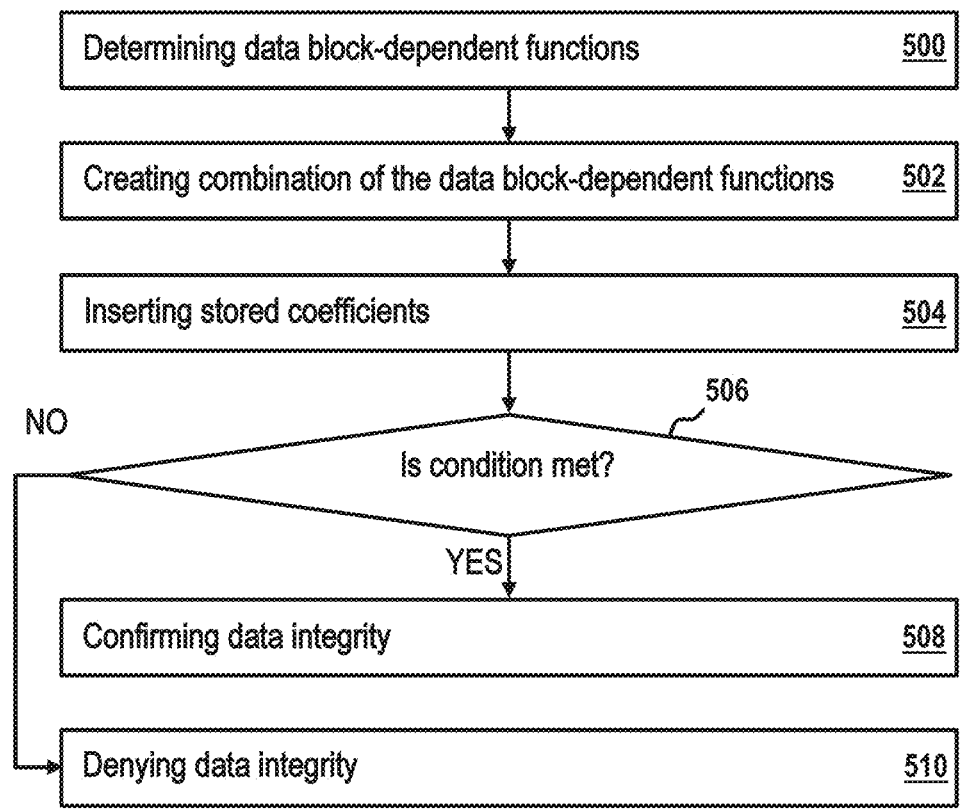
FIG. 5 shows a schematic flow chart of an exemplary method for checking a data block structure.

FIG. 5 shows a further exemplary method for checking the data integrity of the data blocks of a group of data blocks. In step 500, a function, which depends on the data stored in the corresponding data block, is determined for each data block. In step 502, a combination of the functions is created, which encompasses a linear combination of the functions, for example. In step 504, the coefficients stored in the control groups of the group are inserted in the combination created in step 502. In step 506, it is checked whether the created combination of the data blocks with the coefficients stored in the control groups of the group meets a predefined condition. If the stored coefficients meet the predefined condition, the data integrity is confirmed in step 508. If the predefined condition is not met, the data integrity is denied in step 510.

Figure 6:
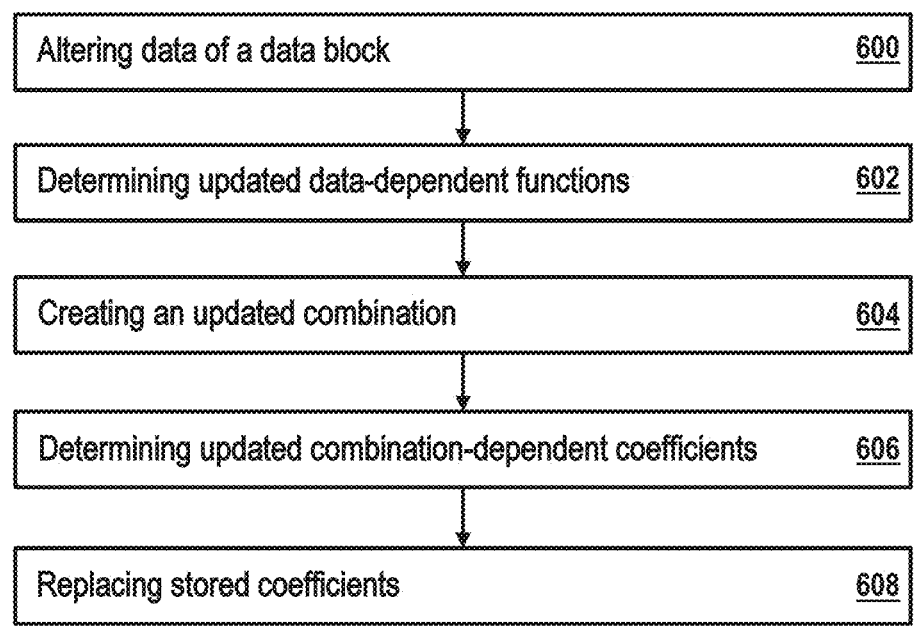
FIG. 6 shows a schematic flow chart of an exemplary method for deleting a data block.

FIG. 6 shows an exemplary method for altering data of a data block of a group of data blocks. An alteration of data may be, for example, an addition of data, a replacement of data and/or a deletion of data of a corresponding data block. In step 600, the data of a data block of the group is altered. In step 602, an updated function is created for the data of the changed data block. In step 604, an updated combination of all functions of the data blocks of the group is created. The updated combination includes, in particular, the updated function for the changed data block. In step 606, updated combination-dependent coefficients are determined so that the updated combination with the corresponding updated combination-dependent coefficients continues to meet the predefined condition. In step 608, finally, the coefficients stored in the control groups, which were determined for the preceding combination, are each replaced with the updated coefficients, which were determined for the updated combination.

Figure 7:
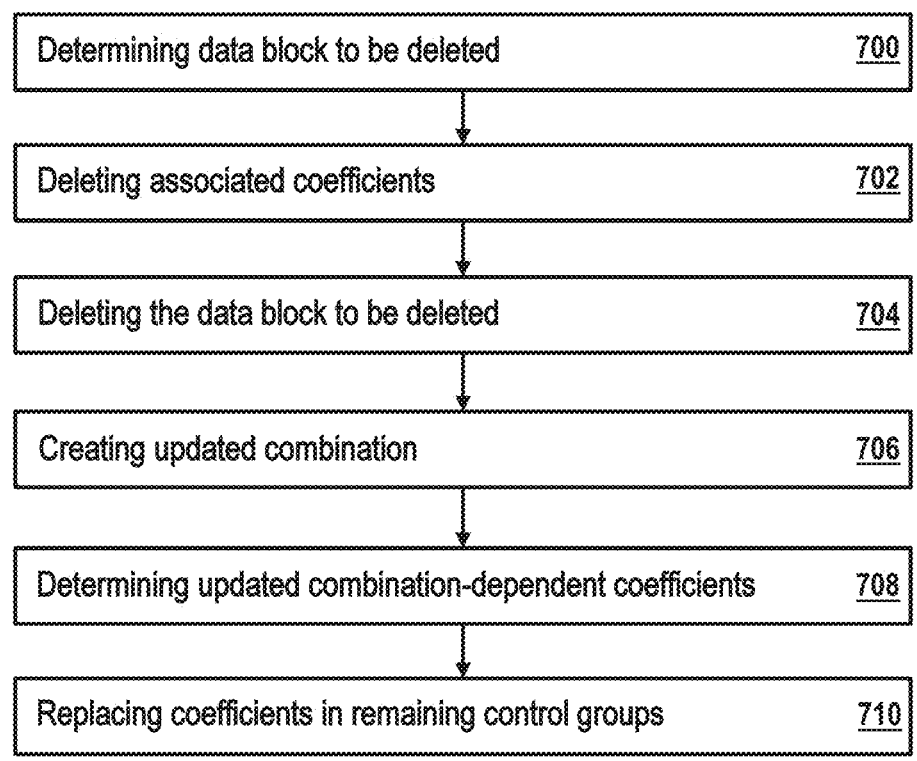
FIG. 7 shows a schematic flow chart of an exemplary method for changing a data block.

FIG. 7 shows an exemplary method for deleting a data block of a group of data blocks. In step 700, the data block of the group to be deleted is determined. In step 702, the coefficients of the function of the data block to be deleted are deleted from the data blocks of the control groups of the data block to be deleted. According to embodiments, the consent of the owner of the corresponding data block in which the coefficient to be deleted is stored is needed for the deletion of the coefficients. In step 704, the data block to be deleted is deleted. According to embodiments, the prior deletion of the coefficients from all data blocks of the control group of the data block to be deleted is required for the deletion of the data block. In this way, initially a vote is carried out by the owners of the data blocks of the corresponding control group. The data block to be deleted is only deleted if all owners of the data blocks of the control group give their consent, and the coefficients are consequently in fact deleted. According to embodiments, the consent of the owner is required to delete the data block, or only the owner has the right to delete. As an alternative, anyone or a limited group of authorized individuals may have the right to delete the data block, on the condition that the respective owners of the data blocks of the control group consent to the deletion of the coefficients. According to embodiments, the owners of the data blocks of the control group have the corresponding right to delete. In step 706, an updated combination of all functions of the remaining data blocks of the group is created. In step 708, updated combination-dependent coefficients are determined for the updated combination, so that the combination continues to meet the predefined condition. In step 710, finally the coefficients in the remaining data blocks of the control groups are replaced with the updated coefficients. According to alternative embodiments, the coefficients may also be deleted in accordance with step 702 at a later point in time, for example, after one of the steps 704 to 710.

Figure 8:
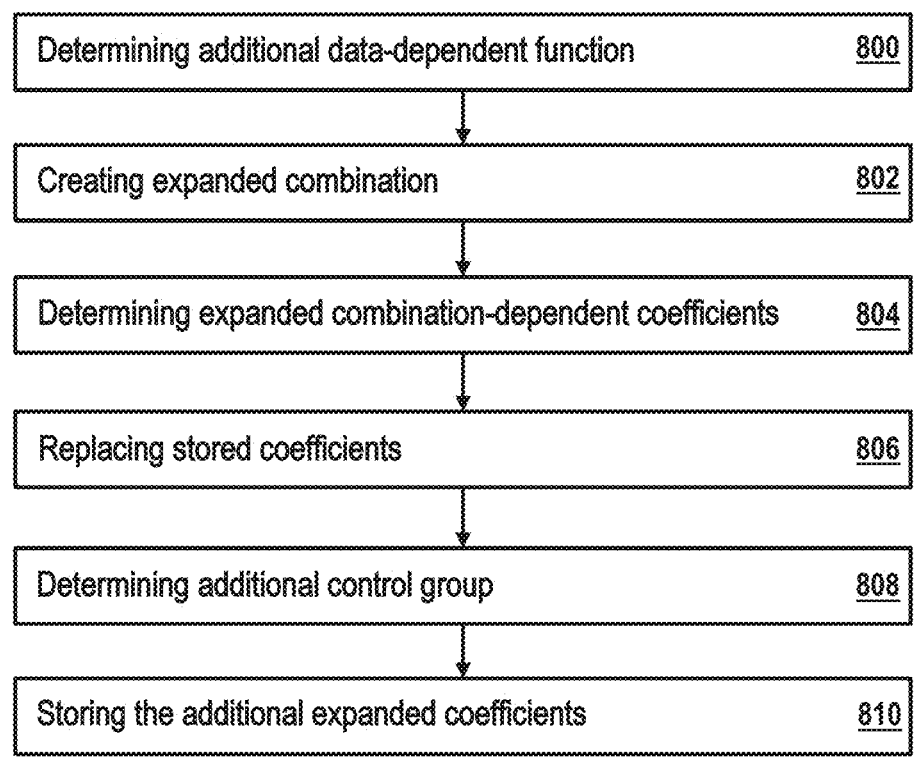
FIG. 8 shows a schematic flow chart of an exemplary method for adding a data block.

FIG. 8 shows an exemplary method for adding an additional data block of a group of data blocks. In step 800, an additional function, which is dependent on the data of the additional data block and is assigned thereto, is determined. In step 802, an expanded combination of all functions of the group expanded by the additional data block is created. In particular, the expanded combination encompasses the additional function determined for the additional data block. In step 804, expanded combination-dependent coefficients are determined for the expanded combination of functions. In step 806, the coefficients stored in the data blocks of the control groups of the first group are replaced with the expanded coefficients. In step 808, a control group is determined for the additional data block. In step 810, the expanded coefficient determined for the additional function of the additional data block is stored in all data blocks of the control group of the additional data block.

Figure 9:
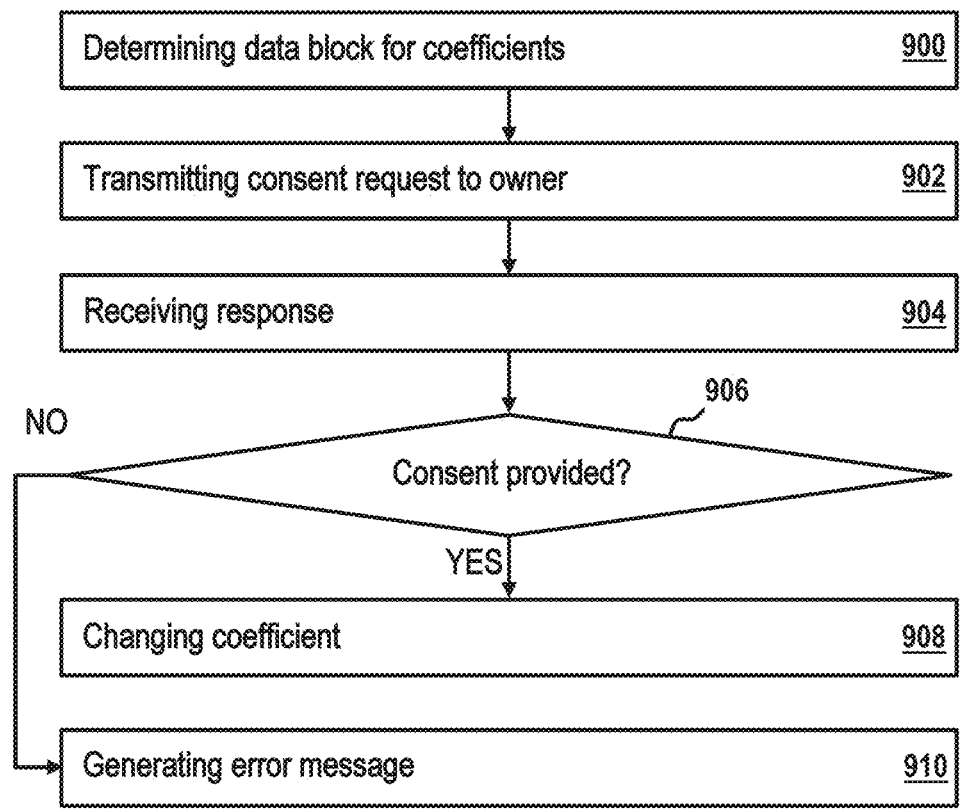
FIG. 9 shows a schematic flow chart of an exemplary method for consenting to the change of coefficients.

FIG. 9 shows an exemplary method for owners of data blocks of a control group to consent to coefficients being changed in the corresponding data blocks. In step 900, a data block is determined, in which a coefficient is to be changed. Changing the coefficient may encompass storing, for example in the form of additionally adding the coefficient to the data block, or replacing a coefficient already stored in the data block. Furthermore, it may also be provided that a coefficient of the data block is deleted. In step 902, a consent request is transmitted to the owner of the corresponding data block. In step 904, a response of the owner is received. In step 906, it is checked whether the response encompasses the owner's consent to the storage of the coefficient. If the response of the owner encompasses a consent to the storage of the coefficient in the data block, the coefficient is changed accordingly in step 908. The consent may involve, for example, the coefficient being signed with a signature key of the owner. In this case, the consent of the owner is checked prior to storage, for example using a signature key. In addition or as an alternative, the coefficient may be stored in signed form in the data block. No change is carried out if the response received in step 904 encompasses a refusal by the owner to carry out the change. A change may likewise be blocked when no response from the owner is received within a predefined time window. If the response of the owner does not encompass a consent to the change of the coefficient in the data block, an error message is transmitted in step 910.

Figure 10:
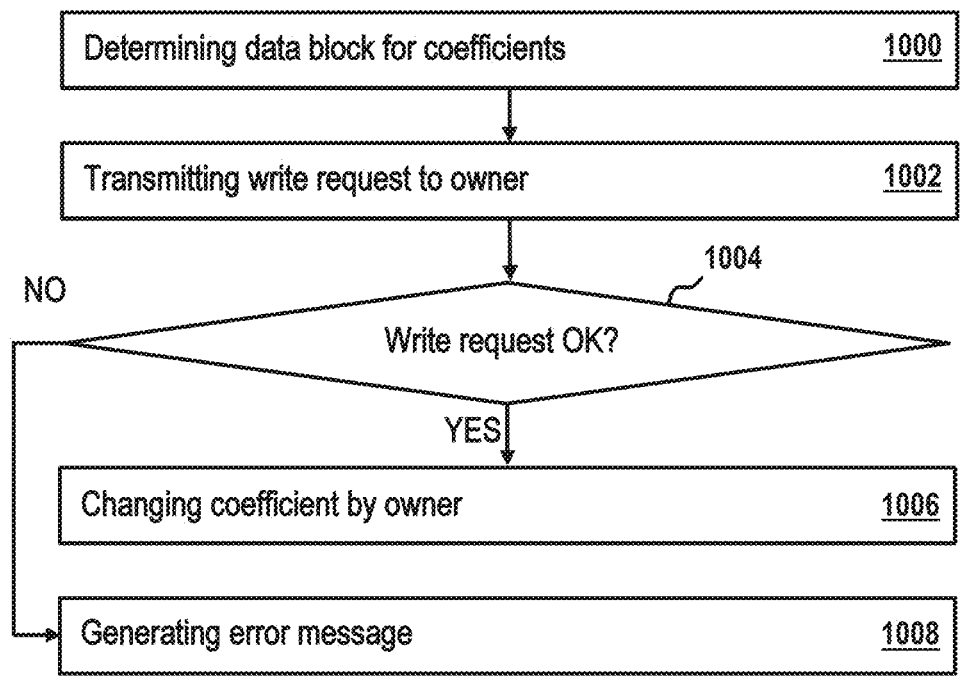
FIG. 10 shows a schematic flow chart of an exemplary method for consenting to the change of coefficients.

FIG. 10 shows an alternative embodiment of the consent method according to FIG. 9. The step 1000 corresponds to the step 900 of FIG. 9. In the present case, however, only the owners of the data blocks are authorized to change coefficients in the corresponding data blocks. In other words, solely the owners have the write permission to change the coefficients or write the coefficients to the data blocks. In step 1002, a write request is consequently transmitted to the owner of the data block identified in step 1000, together with the coefficient to be written or deleted. The owner checks the write request in step 1004 and, if the owner gives his or her consent, the coefficient is changed by the owner in the corresponding data block in step 1006. For example, the coefficient written to the data block includes a signature of the owner of the data block, so that the authenticity of the corresponding coefficient or the consent of the owner is additionally substantiated by the signature. If the owner does not consent to the change, an error message is transmitted in step 1008.

Figure 11:
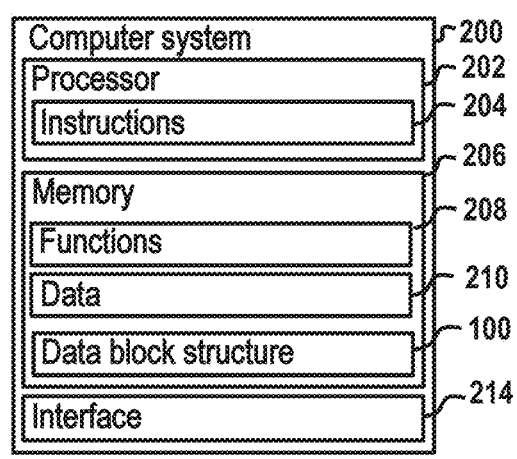
FIG. 11 shows a schematic block diagram of one embodiment of an exemplary data storage system.

FIG. 11 shows a schematic block diagram of one embodiment of an exemplary data storage system 200 in the form of a computer system for storing data 210 in a tamper-proof manner in an electronic memory 206, using a data block structure 100. The computer system 200 comprises a processor 202 which is configured to execute program instructions 204. By executing the program instructions 204, the processor 202 controls the computer system 200 so as to carry out one of the above-described embodiments of the method for storing data in a tamper-proof manner.

The computer system 200 furthermore comprises a memory 206 in which functions 208 for creating data block-dependent functions, for combining the created functions, and for determining combination-dependent coefficients for cryptographically securing the data 210 to be stored in the data block structure 100 are stored. For example, the functions 208 encompass a family of functions, from which the data block-dependent functions are determined by inserting data block-dependent check values as parameters. The memory 206 may, for example, additionally comprise data 210 that is to be protected against manipulation or stored in a tamper-proof manner, using the data block structure 100. For example, the computer system 200 carries out one of the methods according to FIGS. 3 to 10 and generates an additional data block for the data block structure 100, alters the data of a data block of the data block structure 100 or deletes a data block of the data block structure 100. For this purpose, for example, a check value of the data 210 to be stored is calculated and inserted as a parameter in a function of a family of functions, so that a data-dependent function is created for the corresponding data or for the data block storing the corresponding data 210. For the bidirectional concatenation of the additional data block and the existing data blocks of the data structure 100, or for updating the data structure 100 after stored data has been altered or a data block has been deleted, data-dependent check values, data-dependent functions and coefficients of combinations of functions are calculated, using the program instructions 204 and the functions 208.

Finally, the computer system 200 comprises a communication interface 214. For example, this communication interface 214 may be a network interface for communicating via a network or an interface for communicating with a removable medium. The data 210 and/or the data block structure 100 may be provided via the communication interface 214, for example. The communication interface 214 may furthermore be a user interface for a user to commands and/or for outputting results.

For example, the data 210 to be stored is received via the communication interface 214. Furthermore, one or more resulting data blocks and/or the entire data block structure 100 are transmitted.

According to embodiments, the program instructions 204 may encompass a database management system, for example, which manages data block structures, such as data block structure 100, stored in the memory 206, for example.

Figure 12:
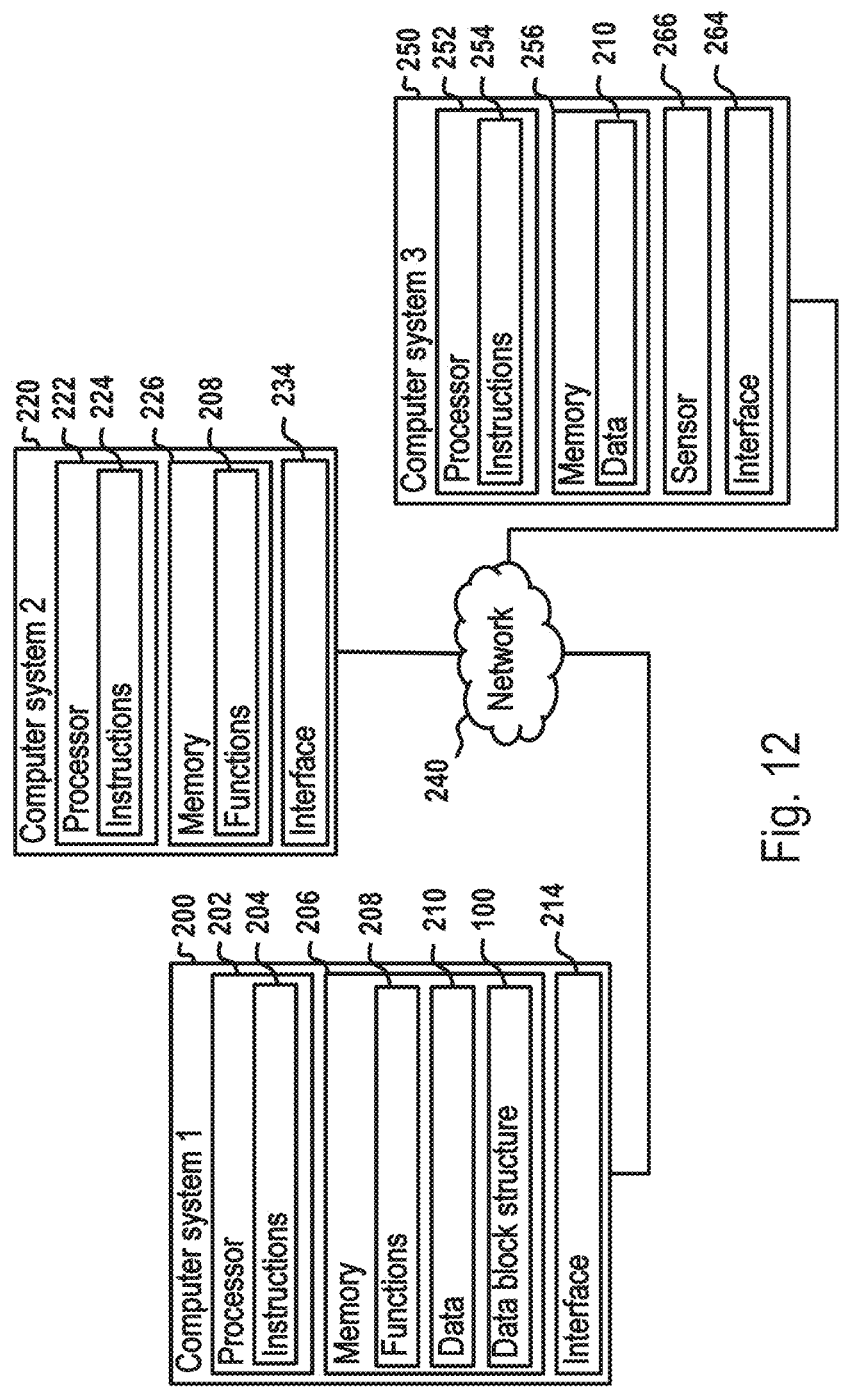
FIG. 12 shows a schematic block diagram of one embodiment of an exemplary telecommunications system.

FIG. 12 shows the exemplary data storage system 200 from FIG. 11, which is configured as a telecommunications system able to communicate with other computer systems, such as the computer systems 220, 250, by way of the communication interface 214 via the network 240. For example, the data 210 is provided by the computer system 250 via the network 240.

The computer system 250 comprises a memory 256, for example, for storing the data 210 to be protected against manipulation by the computer system 200. According to embodiments, the data 210 is data characteristic of a digitally encoded document. For example, the data 210 is a hash value of the content of a digitally encoded document. According to further embodiments, the data 210 is transaction data of a transaction prompted, logged and/or carried out by the computer system 250. According to further embodiments, the data 210 is sensor data detected by way of a sensor 266 of the computer system 250. The computer system 250 furthermore comprises a processor 252, which is configured to execute program instructions 254. According to embodiments, the computer system 250 may also be configured as a telecommunications system, which is able to communicate with the computer systems 200 by way of the communication interface 264 via the network 240. The computer system 250 is prompted to transmit the data 210 to the computer system 200, for example, when the program instructions 254 are executed by the processor 252. The transmission of the data 210 via the network 240 may, for example, take place in response to a request from the computer system 200 or at the own initiative of the computer system 250.

FIG. 12 furthermore shows the computer system 220, which is also configured as a telecommunications system and able to communicate with the computer systems 200 by way of the communication interface 264 via the network 240. For example, the computer system 220 comprises a processor 222 including program instructions 224. The processor 222 is configured to execute the program instructions 224. For example, the computer system 200 is assigned to an owner of a data block of the data block structure 100, in which a combination-dependent coefficient is to be stored. Upon inquiry via the network 240, the computer system 250 consents to the storage. The consent takes place, for example, by signing of the coefficient with a private key associated with the owner. The private key is stored in a protected memory area of memory 256, for example.

A "protected memory area" here shall be understood to mean an area of the electronic memory 256 to which access, that is, read access or write access, is only possible via the processor 252 of the computer system 250. According to embodiments, access from the processor 252 coupled to the memory is 256 only possible when a condition that is required to do so is met. For example, this may be a cryptographic condition, and in particular a successful authentication and/or a successful authorization verification.

Furthermore, an execution of the program instructions 224 by the processor 222 may prompt the computer system 220 to request the data block structure 100 expanded by the data 210 via the network from the computer system 200. In response to a corresponding request, the computer system 220 receives one or more data blocks of the data block structure 100 and/or the entire data block structure 100, for example. According to embodiments, the computer system 220 is able to read out the data block structure 100 and the data stored in the data block structure 100. The computer system 220 may check the integrity of the read-out data, for example, using the functions 208 stored in the memory 226. Using the functions 208, it is possible to recalculate the combination-dependent coefficients, which link the data blocks of the data block structure 100 to one another, and to check these for consistency or integrity. The read-out data is data to verify the authenticity of a digitally encoded document, for example. The corresponding document is provided to the computer system 220 by the computer system 250 via the network 240, for example. If the read-out data is a hash value of the data 210 stored in the document, for example, it is possible to check the authenticity of the provided document based on this data 210. For example, a hash value is calculated for the document by the computer system 220, which is used as a parameter for a function of the family of functions 208.

The data block structure 100 received by the computer system 220 may, in particular, also be used for checks in the offline mode, that is, when the network 240 is temporarily not available. Data to be checked for the authenticity thereof by way of the data block structure 100 is received or read in directly by the computer system 220, for example, without the network 240. This data may then be checked for the authenticity thereof, using the data block structure 100.

LIST OF REFERENCE NUMERALS 100 data block structure
102 data block
104 data block 106 data block
108 data block
110 data block
120 group
122 group
124 group
126 group
200 computer system
202 processor
204 program instructions
206 memory
208 functions
210 data
214 communication interface
220 computer system
222 processor
224 program instructions
226 memory
234 communication interface
240 network
250 computer system
252 processor
254 program instructions
256 memory
264 communication interface
266 sensor
$B_1, \ldots, B_N$ data block
$D_1, \ldots, D_N$ data
$\xi_1, \ldots, \xi_N$ data-dependent function
$c_1, \ldots, c_N$ coefficient
$\psi$ status function

The invention claimed is:

1. A method for storing data in a tamper-proof manner in an electronic memory, using a data block structure comprising a plurality of data blocks, wherein each of the data blocks is assigned a function that is dependent on the data stored in a corresponding data block of the plurality of data blocks, comprising:
for a first group of data blocks of the plurality of data blocks:
determining the functions assigned to the data blocks of the first group;
creating a first combination of all functions assigned to the data blocks of the first group; and
determining a combination-dependent coefficient for each function of the first combination so that the first combination meets a first predefined condition, wherein all data blocks of the first group of data blocks are mutually concatenated by the combination-dependent coefficients so that each data block of the first group is dependent on all other data blocks of the first group;
for each data block of the first group:
determining a control group of data blocks of the first group assigned to the corresponding data block; and
storing the coefficient that was determined for the function of the corresponding data block in all data blocks of the control group.

2. The method according to claim 1, wherein each of the control groups comprises all data blocks of the first group, except for the data block to which they are assigned.

3. The method according to claim 1, wherein the control groups that are assigned to the data blocks of a first of the control groups in each case include the data block to which the first control group is assigned.

4. The method according to claim 3, wherein a respective bidirectional link between the data block to which the corresponding control group is assigned, and each data block comprised by the control group is implemented in the case of each control group.

5. The method according to claim 1, wherein the first group includes three or more data blocks.

6. The method according to claim 1, wherein at least one of the control groups includes three or more data blocks.

7. The method according to claim 1, wherein the combination is created using a connection function for connecting all functions assigned to the data blocks of the first group.

8. The method according to claim 1, wherein the first predefined condition encompasses an extreme value condition.

9. The method according to claim 1, wherein the number of the data blocks comprising the first group is dependent on a security level of at least one data block of the first group.

10. The method according to claim 1, wherein the data blocks are assigned to the first group using a first assignment criterion.

11. The method according to claim 10, wherein the first assignment criterion encompasses an assignment of the content of the corresponding data blocks to a shared content category, an assignment of the content of the corresponding data blocks to a shared security level, an assignment of the owners of the corresponding data blocks to a shared owner group, an assignment of the content of the corresponding data blocks to a dependency relationship and/or an assignment of the owners of the corresponding data blocks to a dependency relationship.

12. The method according claim 1, wherein the number of the data blocks comprising the control groups is dependent on a security level of the data block to which the corresponding control group is assigned.

13. The method according to claim 1, wherein the data blocks that comprise the respective control groups are determined using a second assignment criterion.

14. The method according to claim 13, wherein the second assignment criterion encompasses an assignment of the content of the corresponding data blocks to a shared content category, an assignment of the content of the corresponding data blocks to a shared security level, an assignment of the owners of the corresponding data blocks to a shared owner group, an assignment of the content of the corresponding data blocks to a dependency relationship and/or an assignment of the owners of the corresponding data blocks to a dependency relationship.

15. The method according to claim 1, wherein at least one owner is assigned to each data block, and storing the coefficients in the data blocks in each case requires a consent of the at least one owner of the corresponding data block.

16. The method according to claim 15, wherein the consents in each case include a signature of the corresponding coefficient with a private signature key of the owner of the data block to which the coefficient is to be added.

17. The method according to claim 15, wherein the owners of the data blocks in each case have an exclusive write permission for adding data to the particular data blocks.

18. The method according to claim 1, further comprising:
checking data integrity of one of the data blocks of the first group of data blocks, including:
determining the combination-dependent coefficient for the function of the one data block to be checked as a check coefficient so that the first combination meets the first predefined condition;

comparing the check coefficient to the coefficients stored in the data blocks of the control group of the one data block to be checked for the function of the corresponding data block; and confirming the data integrity of the one data block to be checked when a predefined agreement criterion between the check coefficient and the stored coefficients is met.

19. The method according to claim 18, wherein the predefined agreement criterion is met when there is identity between the check coefficient and at least one of the stored coefficients.

20. The method according to claim 19, wherein the predefined agreement criterion is met when there is identity between the check coefficient and all stored coefficients.

21. The method according to claim 18, wherein the data integrity of all blocks of the first group is checked.

22. The method according to claim 1, further comprising:
checking whether the created first combination with the coefficients stored in the data blocks of the control group of the first group meets the first predefined condition; and
confirming the data integrity of the data blocks of the first group when the first predefined condition is met.

23. The method according to claim 18, wherein the data integrity is checked prior to data being read out from one or more data blocks of the first group, at least for the data blocks from which data is being read out.

24. The method according to claim 1, the method further comprising:
altering the data of a data block of the first group;
determining an updated functions which is assigned to the altered data block and dependent on the data of the altered data block;
creating an updated combination of all functions assigned to the data blocks of the first group, the updated combination including the updated function for the altered data block;
determining an updated combination-dependent coefficient for each function of the updated combination, so that the updated combination meets the first predefined condition; and
replacing the coefficients stored in the data blocks of the control groups of the first group, which were determined for the first combination, with an updated coefficient which was determined for the updated combination.

25. The method according to claim 1, the method further comprising:
determining a data block of the first group to be deleted;
deleting the coefficients of the function of the data block to be deleted in the data blocks of the control groups of the data block to be deleted;
deleting the data block to be deleted;
creating an updated combination of all functions assigned to the remaining data blocks of the first group;
determining an updated combination-dependent coefficient for each function of the updated combination, so that the updated combination meets the first predefined condition; and
replacing the coefficients stored in the remaining data blocks of the control groups of the first group, which were determined for the first combination, with an updated coefficient which was determined for the updated combination.

26. The method according to claim 1, the method further comprising:

adding an additional data block to the first group of data blocks;
determining an additional function which is assigned to the additional data block and dependent on the data of the additional data block;
creating an expanded combination of all functions assigned to the data blocks of the first group from the first combination and the additional function;
determining an expanded combination-dependent coefficient for each function of the expanded combination, so that the expanded combination meets the first predefined condition;
replacing the coefficients stored in the data blocks of the control groups of the first group, which were determined for the first combination, with an expanded coefficient, which was determined for the expanded combination;
determining an additional control group of data blocks of the first group for the additional data block; and
storing the expanded coefficient determined for the additional function of the additional data block in all data blocks of the additional control group.

27. The method according to claim 1, further comprising:
for a second group of data blocks:
determining functions assigned to the data blocks of the second group;
creating a second combination of all functions assigned to the data blocks of the second group; and
determining a combination-dependent coefficient for each function of the second combination so that the second combination meets the first predefined condition;
for each data block of the second group:
determining a control group of data blocks of the second group assigned to the corresponding data block; and
a storing the coefficient that was determined for the function of the corresponding data block in all data blocks of the control group.

28. The method according to claim 27, wherein the second group of data blocks comprises some of the data blocks of the first group of data blocks.

29. The method according to claim 27, wherein the second group of data blocks comprises all data blocks of the first group of data blocks.

30. The method according to claim 1, wherein, for three or more groups of data blocks, the method further comprises mutually concatenating data blocks of a corresponding group in such a way that each data block of the corresponding group is dependent on all other data blocks of the corresponding group, each group in succession comprising at least one data block of a predecessor group in the succession, and a last group of the succession being the predecessor group of a first group of the succession, so that the data blocks of each of the three or more groups are dependent on the data blocks of all other groups.

31. The method according to claim 1, wherein, for four or more groups of data blocks, the method further comprises mutually concatenating data blocks of a corresponding group in such a way that each data block of the corresponding group is dependent on all other data blocks of the corresponding group, one of the four or more groups comprising at least one data block of all further of the four or more groups, so that the data blocks of each of the four or more groups are dependent on the data blocks of all other groups.

32. An electronic data storage system for storing data, comprising:
an electronic memory configured to store the data in a tamper-proof manner using a data block structure comprising a plurality of data blocks, each of the data blocks being assigned a function that is dependent on the data stored in a corresponding data block of the plurality of data blocks;
a processor; and
machine-readable instructions stored in the electronic memory,
the processor configured to execute the machine-readable instructions to perform:
for a group of data blocks of the plurality of data blocks:
determining the functions assigned to the data blocks of the group;
creating a combination of all functions assigned to the data blocks of the group; and
determining a combination-dependent coefficient for each function of the combination, so that the combination meets a predefined condition, wherein all data blocks of the group of data blocks are mutually concatenated by the combination-dependent coefficients so that each data block of the group is dependent on all other data blocks of the group;
for each data block of the group:
determining a control group of data blocks of the group assigned to the corresponding data block; and
storing the coefficient that was determined for the function of the corresponding data block in all data blocks of the control group.

33. A telecommunications system, comprising:
the electronic data storage system according to claim 32; and
a communication interface for communicating via a network,
at least one of the data blocks of the first group being a data block that is added to the first group and includes the data to be stored in the data block structure, the data storage system being configured to receive the data to be stored by way of the communication interface via the network.

34. The telecommunications system according to claim 33, wherein the processor is configured to execute the machine-readable instructions to further perform:
receiving a request for at least a portion of a data block of the group of data blocks from a requesting telecommunications system by way of the communication interface via the network; and
checking data integrity of the requested data block, the integrity check comprising:
determining the combination-dependent coefficient for the function of the data block to be checked as a check coefficient, so that the combination meets the predefined condition;
comparing the check coefficient to the coefficients stored in the data blocks of the control group of the data block to be checked for the function of the corresponding data block;
confirming the data integrity of the data block to be checked when a predefined agreement criterion between the check coefficient and the stored coefficients is met; and
upon confirmation of the data integrity, transmitting the requested portion of the data block and a confirmation message for confirming the data integrity of the requested data block by way of the communication interface via the network to the requesting telecommunications system, in response to the received request.

* * * * *